(12) United States Patent
Lane et al.

(10) Patent No.: US 12,440,108 B2
(45) Date of Patent: Oct. 14, 2025

(54) TEMPERATURE SCREENING SYSTEMS AND METHODS

(71) Applicant: Welch Allyn, Inc., Skaneateles Falls, NY (US)

(72) Inventors: John A. Lane, Weedsport, NY (US); Carlos Suarez, Syracuse, NY (US); Rachel K. Douglas, Latrobe, PA (US); Matthew D. Mullin, Memphis, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 352 days.

(21) Appl. No.: 17/333,956

(22) Filed: May 28, 2021

(65) Prior Publication Data

US 2021/0369122 A1 Dec. 2, 2021

Related U.S. Application Data

(60) Provisional application No. 63/032,850, filed on Jun. 1, 2020.

(51) Int. Cl.
*A61B 5/00* (2006.01)
*A61B 5/01* (2006.01)

(52) U.S. Cl.
CPC .............. *A61B 5/01* (2013.01); *A61B 5/0035* (2013.01); *A61B 5/0077* (2013.01); *A61B 5/743* (2013.01)

(58) Field of Classification Search
CPC ....... A61B 5/01; A61B 5/0035; A61B 5/0077; A61B 5/743; G01J 5/0025; G01J 5/025; G01J 5/07; G01J 5/53; G01J 2005/0077; G01J 5/0275
See application file for complete search history.

(56) References Cited

U.S. PATENT DOCUMENTS

| | | | |
|---|---|---|---|
| 7,340,293 B2 | 3/2008 | McQuilkin | |
| 2006/0232675 A1* | 10/2006 | Chamberlain | G01J 5/53 348/164 |
| 2007/0153871 A1* | 7/2007 | Fraden | A61B 5/015 374/121 |
| 2007/0187605 A1* | 8/2007 | Micko | G01J 5/08 250/339.04 |

(Continued)

FOREIGN PATENT DOCUMENTS

WO    WO2014025537 A1    2/2014

OTHER PUBLICATIONS

Extended European Search Report mailed Oct. 22, 2021 for European Patent Application No. 21177264.5, 10 pages.

(Continued)

*Primary Examiner* — Pascal M Bui Pho
*Assistant Examiner* — Gabriel Victor Popescu
(74) *Attorney, Agent, or Firm* — Lee & Hayes, P.C.

(57) ABSTRACT

A screening method includes controlling a heat source of a screening device to reach a selected temperature, determining a location of a subject, and determining that the location is a desired distance from the screening device. The method also includes based at least in part on determining that the location is the desired distance from the screening device, simultaneously determining a temperature of the subject and a temperature of the heat source using a temperature sensor of the screening device.

15 Claims, 7 Drawing Sheets

(56) References Cited

U.S. PATENT DOCUMENTS

| | | | |
|---|---|---|---|
| 2013/0223472 A1* | 8/2013 | Maston | G01J 5/53 |
| | | | 374/2 |
| 2015/0265159 A1* | 9/2015 | Lane et al. | A61B 5/01 |
| | | | 600/549 |
| 2015/0342465 A1* | 12/2015 | Chang | A61B 5/01 |
| | | | 600/474 |
| 2017/0035302 A1* | 2/2017 | Mullin | A61B 5/01 |
| 2019/0212060 A1* | 7/2019 | Lintonen | G01J 5/08 |
| 2020/0105407 A1 | 4/2020 | Soreefan | |
| 2020/0256747 A1* | 8/2020 | Hofvander et al. | A61N 5/00 |

OTHER PUBLICATIONS

HGH Infrared Systems, "Accurate Fever Detection and Temperature Measurement with the new CN-37 Blackbody", YouTube, May 22, 2020, 5 pages.

* cited by examiner

TEMPERATURE SCREENING SYSTEMS AND METHODS

CROSS-REFERENCE TO RELATED APPLICATIONS

The present application is a nonprovisional of, and claims priority to, U.S. Provisional Application No. 63/032,850, filed Jun. 1, 2020, the entire disclosure of which is incorporated herein by reference.

FIELD OF THE INVENTION

This application is directed to medical equipment, and in particular, to systems and methods associated with determining the temperature of a subject, and of a separate heat source, disposed within the field of view of a sensor.

BACKGROUND OF THE INVENTION

Temperature is an important vital sign in evaluating personal health. For example, in healthcare settings, and in work environments in which entry into an office building or other workplace is monitored, physicians, nurses, office building personnel, or other employees commonly use a variety of methods for determining a subject's temperature. Such methods include, for example, obtaining temperature measurements with a thermometer. While thermometers utilizing mercury have been in existence for many years, modern thermometers typically employ one or more electronic sensors configured to measure the temperature of a patient, an office worker, or other subjects. Such sensors may take one or more measurements over a relatively short period of time. Based on these measurements, the thermometer may generate an estimated internal and/or core temperature of the patient.

Existing non-contact thermometers typically employ a sensing element configured to measure the temperature of, for example, the subject's forehead, temple, and/or other external body surfaces without contacting these surfaces, and to estimate the subject's core temperature based on such measurements. However, since the accuracy of measurements taken with existing non-contact thermometers is highly dependent upon the alignment of the device relative to the external body surface, such thermometers can be prone to error and are not highly reliable. Additionally, such non-contact thermometers are not typically configured to measure the reference temperature of a separate heat source while measuring the temperature of the subject. As a result, such non-contact thermometers are not suitable for applications in which a healthcare facility, a business owner, an office building manager, or other user wishes to accurately screen the temperatures of respective subjects with reference to a desired (e.g., selectable) temperature threshold.

The example embodiments of the present disclosure are directed toward overcoming at least the deficiencies described above.

SUMMARY

As will be described in greater detail below, example embodiments of the present disclosure include temperature screening systems in which the temperature screening device can be utilized to determine the temperature of one or more subjects without contacting a skin surface of the subject. Such temperature screening systems may be utilized, for example, in the entrance of a healthcare facility, a school, church, an office building, a nursing home, a grocery store, a mall, a movie theater, a restaurant, and/or any other facility in which people (e.g., subjects) enter and exit the facility on a somewhat regular basis. The temperature screening devices included in such systems may be configured to capture one or more temperature measurements once the subject is positioned within a field of view of one or more temperature sensors of the temperature screening device.

Additionally, in some examples, the temperature screening device and/or the temperature screening system generally, may include one or more heat sources. In such examples, the heat source may be controlled by a user to reach a desired reference temperature. For example, some facilities may require that subjects have a temperature (e.g., a core temperature) less than or equal to such a reference temperature before the subject is permitted to enter the facility. In such examples, the user may control the heat source to reach the selected/desired reference temperature, and one or more temperature sensors of the temperature screening device may determine the temperature of both the heat source and the subject. For example, the heat source may be disposed within a field of view of one or more temperature sensors of the temperature screening device. In this way, when such temperature sensors are utilized to determine the temperature of the subject, the temperature sensors may also determine the temperature of the heat source. Additionally or alternatively, the heat source may be disposed within a field of view of one or more additional temperature sensors of the temperature screening device, and such additional temperature sensors may be specifically configured to determine the temperature of the heat source.

Regardless of the configuration, however, the temperature of the heat source can be compared with the temperature of the subject, as determined by the same temperature sensor(s) of the temperature screening device, to determine whether the temperature of the subject is acceptable for entry into the facility. Since the reference temperature of the heat source can be determined with a high degree of accuracy, a comparison of the determined subject temperature with the determined temperature of the heat source can provide a highly reliable indication as to whether the subject should be permitted entry or whether the subject should be referred for further evaluation.

For instance, in an example embodiment of the present disclosure, a screening method includes controlling a heat source of a screening device to reach a selected temperature, determining a location of a subject, and determining that the location is a desired distance from the screening device. The method also includes based at least in part on determining that the location is the desired distance from the screening device, simultaneously determining a temperature of the subject and a temperature of the heat source using a temperature sensor of the screening device.

In another example embodiment, a screening device includes a controller, a temperature sensor operably connected to the controller and having a field of view, and a heat source operably connected to the controller and disposed at least partly within the field of view of the temperature sensor. In such an example, the temperature sensor is configured to simultaneously determine a temperature of a subject and a temperature of the heat source.

In a further example, a screening system includes a controller; a device housing; and a temperature sensor operably connected to the controller and supported by the housing, the temperature sensor having a field of view. The system also includes a heat source operably connected to the controller and disposed at least partly within the field of view of the temperature sensor. In such a system, the temperature is being configured to simultaneously determine a temperature of a measurement site on a skin surface of a subject, and a temperature of the heat source, without contacting the subject and the heat source.

In another example, a temperature screening device includes a housing; a controller disposed within the housing; a first temperature sensor operably connected to the controller and supported by the housing, the first temperature sensor having a first field of view; and a heat source operably connected to the controller and disposed at least partly within the first field of view, the first temperature sensor being configured to determine a temperature of the heat source. Such a temperature screening device also includes a second temperature sensor operably connected to the controller and supported by the housing. In such an example, the second temperature sensor has a second field of view larger than the first field of view. Additionally, the second temperature sensor is configured to determine a temperature of a measurement site on a skin surface of a subject, without contacting the subject, and when the measurement site is disposed within the second field of view. Further, the controller is configured to determine a core temperature of the subject based on the temperature of the heat source determined by the first temperature sensor and the temperature of the measurement site determined by the second temperature sensor.

In still another example, a screening method includes controlling a heat source of a temperature screening device to reach a selected temperature; determining a location of a subject; and determining that the location is a desired distance from the temperature screening device. Such an example method also includes, based at least in part on determining that the location is the desired distance from the temperature screening device, simultaneously determining a temperature of a measurement site on a skin surface of the subject and a temperature of the heat source, using a temperature sensor of the temperature screening device, and without contacting the subject and the heat source.

DETAILED DESCRIPTION

Figure 1:
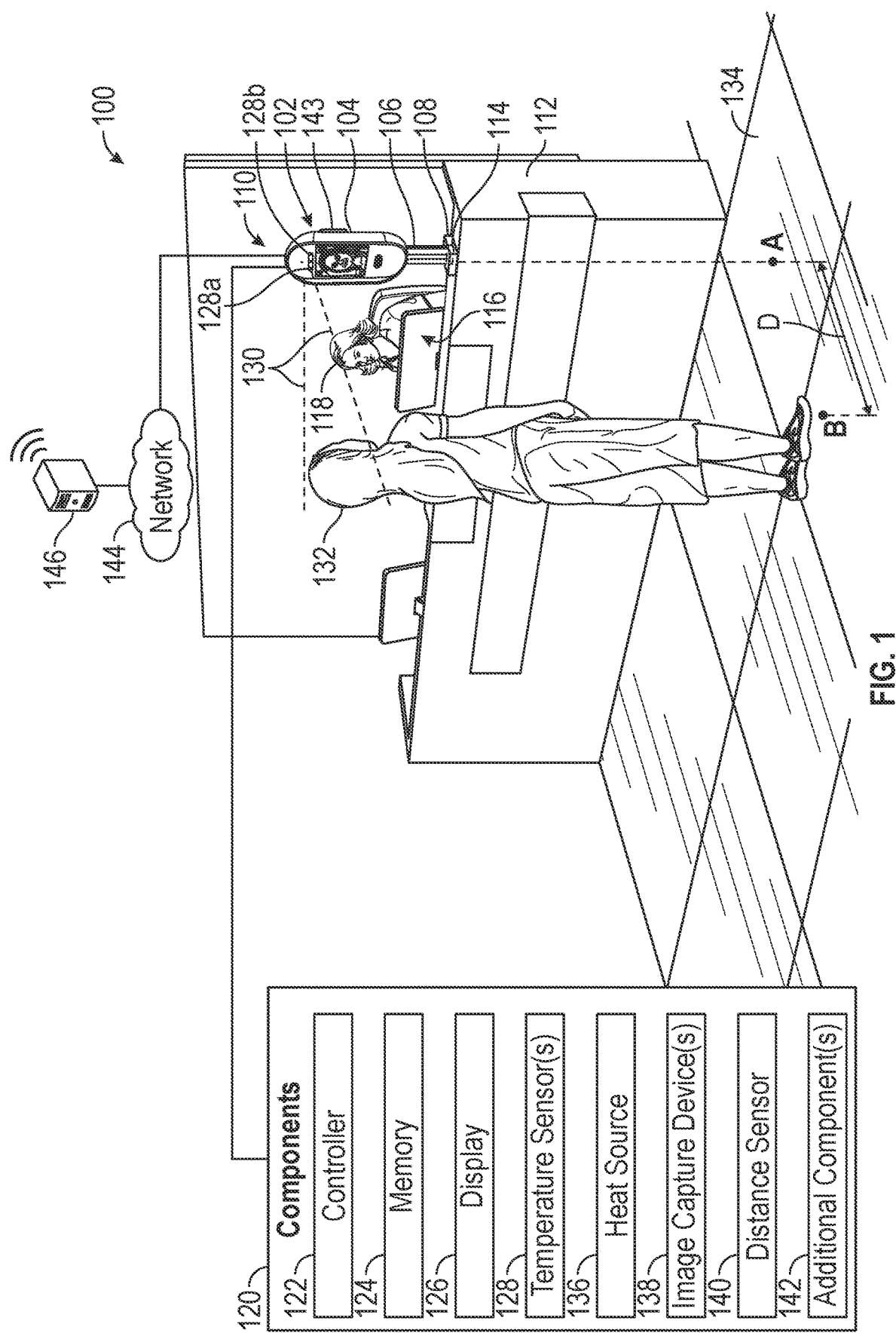
FIG. 1 illustrates a temperature screening system according to an example embodiment of the present disclosure.

FIG. 1 illustrates an example temperature screening system 100 of the present disclosure including a temperature screening device 102. As will be described in greater detail below, the temperature screening device 102 may include one or more temperature sensors configured to sense, measure, detect, and/or otherwise determine the temperature of various locations on a skin surface or other measurement sites of a subject. The temperature screening device 102 may also include one or more heat sources disposed within a field of view of the temperature sensors described above. In this way, the temperature sensors may also sense, measure, detect, and/or otherwise determine the temperature of the heat source commensurate with (e.g., simultaneously with) determining the temperatures of the locations on the skin surface of the subject. The various temperatures determined by such temperature sensors may be utilized to screen the subject for various potential illnesses, and in some examples, the temperatures determined by such temperature sensors can be used to determine whether the subject has a core temperature that is less than or equal to a threshold temperature that is required for entry at a facility in which the temperature screening system 100 is employed.

In any of the examples described herein, the temperature screening device 102 may include a housing 104 that is movably connected to a stem 106, and a base 108 configured to support the stem 106 and the housing 104. For example, the housing 104 may be made from plastic, aluminum, and/or any other polymer or alloy that is acceptable for use with medical devices. Such materials may be suitable for repeated use and/or repeated sanitation. The stem 106 may be made from any of the materials described above with respect to the housing 104, and in some examples, the stem 106 may comprise a substantially rigid shaft, beam, and/or other structure configured to support the housing 104 at any desired location vertically spaced from the base 108. The housing 104 may define an internal space that is substantially watertight, substantially hermetically sealed, and/or that is suitable to support and/or otherwise house various components of the temperature screening device 102. One or more waterproof seals may be included and/or otherwise utilized with components of the temperature screening device 102 to facilitate forming such an internal space. The housing 104 may mate with the stem 106, such that the housing 104 may be movable (e.g., slidable) along the stem 106 in a first substantially linear direction away from the base 108, and in a second substantially linear direction toward the base 108. In some examples, the housing 104 may include one or more grooves, channels, flanges, and/or other structures configured to accept one or more corresponding structures of the stem 106. Additionally, the stem 106, and/or the housing 104 may include one or more thumbscrews, set screws, and/or other components configured to temporarily fix the position of the housing 104 relative to the stem 106 during use of the temperature screening device 102. Accordingly, the housing 104 may be moved vertically upward or downward to accommodate adjustments for subjects 132 of different heights (e.g., children, adults, etc.). In some examples, the housing 104 may be automatically moveable along the stem 106.

The base 108 may be made from any of the materials described above with respect to the housing 104 and/or the stem 106. For example, the base 108 may comprise a substantially rigid platform, and the stem 106 may be connected to or formed integral with the base 108. In such examples, the stem 106 and the base 108 may comprise a one-piece construction, and the temperature screening device 102 may be removably attached to the stem 106 during use. As illustrated in FIG. 1, the temperature screening device 102, and/or other components of the temperature screening system 100 may be utilized in a kiosk, a lobby, an entrance, and/or any other desired location 110 within a facility. As noted above, such a facility may include, among other things, a healthcare facility, a school, church, an office building, a nursing home, a grocery store, a mall, a movie theater, a restaurant, and/or any other facility in which people (e.g., subjects) enter and exit the facility on a somewhat regular basis. In such examples, the base 108 and/or other components of the temperature screening device 102 may be configured to be positioned on, for example, a ledge, a table, a desk, the shelf, and/or other structure 112 present at the location 110 during use of the temperature screening device 102. In such examples, the desk and/or other structure 112 may be between approximately 3 feet and approximately 4 feet tall such that the housing 104 of the temperature screening device 102 may be disposed at approximately chest-level or at approximately eye-level relative to a subject during use. As noted above, the housing 104 may be movable (e.g., vertically) toward and away from the base 108 such that the temperature screening device 102 may be positioned at a desired height, relative to the subject, when the base 108 is disposed on the structure 112.

In some examples, various components of the temperature screening device 102 may be operably, electrically, controllably, and/or otherwise connected to other devices disposed at the location 110. For example, one or more processors, microprocessors, and/or other controllers 114 of the temperature screening device 102 may be operably connected to one or more desktop computers, laptop computers, servers, tablets, additional electronic (e.g., infrared) thermometers, and/or other electronic devices 116 disposed at and/or otherwise associated with the location 110. In such examples, a user 118 disposed at the location 110 may utilize one or more such electronic devices 116 to at least partly control operation of the temperature screening device 102. For example, the electronic device 116 may be configured to control the temperature screening device 102 to provide information to a subject via a display of the temperature screening device 102 as part of a temperature screening workflow. Additionally or alternatively, the electronic device 116 may be configured to activate and/or otherwise control the one or more temperature sensors, the heat source, and/or other components of the temperature screening device 102 as part of a temperature screening workflow. In any of the examples described herein, the base 108 may include one or more ports, jacks, and/or other connection components configured to operably connected. The temperature screening device 102, with the one or more electronic devices 116. At the location 110. Additionally or alternatively, the temperature screening device 102 may include one or more near field communication components, Bluetooth components, Wi-Fi components, and/or any other wireless communication components necessary to facilitate and operable connection between the temperature screening device 102 and the one or more electronic devices 116.

As shown schematically in FIG. 1, the temperature screening device 102 may include a variety of components 120 configured to assist in performing the various functions described herein. For example, the temperature screening device 102 of the system 100 may include a controller 122, a memory 124 operably connected to the controller 122, and a display 126 operably connected to the controller 122. The temperature screening device 102 may also include one or more temperature sensors 128 operably connected to the controller 122 and supported by (e.g., disposed on, disposed at least partly within, connected to, etc.) the housing 104. The one or more temperature sensors 128 may be configured to determine a temperature of a subject 132. For example, the one or more temperature sensors 128 may have and/or may otherwise be characterized a field of view 130, and the temperature sensors 128 may be configured to determine a temperature of a skin surface and/or other measurement site of the subject 132 when the desired measurement site is disposed within the field of view 130. For instance, in some examples the subject 132 may be instructed to stand, on a floor, platform, or other support surface 134, at a desired distance D from the temperature screening device 102 (e.g., a desired distance D from the housing 104 and/or other portions of the temperature screening device 102) such that the face or other measurement site of the subject 132 is within the filed of view 130 of the one or more temperature sensors 128. Such a distance D may be, for example, a substantially linear (e.g., a substantially horizontal) distance extending from a first plane or location A associated with the temperature screening device 102, to a second plane or location B associated with the subject 132.

As shown in FIG. 1, an example distance D may extend from a plane or location A substantially defined by the temperature screening device 102 (e.g., by a front surface of the temperature screening device 102) to a plane or location B substantially defined by the subject 132. For example, the distance D may extend from the plane or location A to a plane or location B substantially defined by at least a portion of the face of the subject 132. In still further examples, the distance D may extend from the plane or location A to a plane or location B substantially defined by any other portion and/or measurement site formed by an external surface of the skin of the subject 132, such as the face, forehead, temple, ears (such as the outer or inner ear), eyes, nose, lips, neck, wrist, chin, open mouth, and/or other like skin surfaces. Such measurement sites may also include the oral cavity, rectal cavity, axilla area, ear drum, groin, subclavian, and/or other known body cavities or areas. In example embodiments, the plane or location B may comprise and/or be substantially parallel to a coronal plane of the subject 132. Additionally, an example plane B may extend substantially parallel to a spinal axis of the subject 132.

With reference to the example temperature screening device 102 shown in FIG. 1, the controller 122 may be substantially similar to and/or the same as the controller 114 described above, and in some examples, the controller 114 may be omitted. In any of the examples described herein, the controller 122 of the temperature screening device 122 may be disposed in, for example, the housing 104. The example controller 122 may comprise a single processing unit or a number of processing units, and can include single or multiple computing units or multiple processing cores. The controller 122 can be implemented as one or more processors, microprocessors, microcomputers, microcontrollers, digital signal processors, central processing units, state machines, logic circuitries, and/or any devices that manipulate signals based on operational instructions. For example, the controller 122 can be one or more hardware processors and/or logic circuits of any suitable type specifically programmed or configured to execute the algorithms and processes described herein. The controller 122 can be configured to retrieve and execute computer-readable instructions stored in the memory 124, which can program the processors or other components of the controller 122 to perform the functions described herein.

The memory 124 may comprise computer-readable media, and the memory 124 can include volatile and nonvolatile memory, and/or removable and non-removable media implemented in any type of technology for storage of information, such as computer-readable instructions, data structures, program modules, or other data. Such computer-readable media and/or other memory 124 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. The memory 124 can be a type of computer-readable storage media and/or can be a tangible non-transitory media to the extent that when mentioned, non-transitory computer-readable media exclude media such as energy, carrier signals, electromagnetic waves, and signals per se. The memory 124 can be used to store any number of functional components that are executable by the controller 122. In many implementations, these functional components comprise instructions, algorithms, neural networks, or programs that are executable by the controller 122 and that, when executed, specifically configure the controller 122 (e.g., one or more processors of the controller 122) to perform actions associated with one or more temperature screening operations.

The display 126 may comprise, for example, a liquid crystal display (LCD) screen, a light emitting diode (LED) display, a digital read-out, an interactive touch-screen, and/or any other like components configured to communicate information to the user 118, to communicate information to the subject 132, and/or or to control the temperature screening device 102. Such a display 126 may be configured to indicate, for example, one or more distances D associated with the field of view 130 described herein. Such a display 126 may also be configured to indicate temperatures determined by the one or more temperature sensors 128 and/or a core temperature of the subject 132 determined based on signals received from one or more of the temperature sensors 128. Additionally, the display 126 may be configured to indicate an ambient temperature associated with the location 110 in which the temperature screening device 102 is being used, the name, age, gender, and/or any other information associated with the subject 132, as well as any other information that may be useful during operation of the temperature screening device 102. For example, as will be described below, the display 126 may also be configured to communicate instructions or other information indicative of the distance D, the field of view 130, and/or other alignment parameters associated with the one or more temperature sensors 128 and/or other components 120 of the temperature screening device 102. The display 126 may also be configured to display one or more visual indicia and/or visual indicators useful in properly positioning the subject 132 relative to the temperature screening device 102. Such visual indicia may be displayed by the display 126 to indicate the subject 132 is disposed at a desired distance D from the housing 104 and/or other portions of the temperature screening device 102.

The one or more temperature sensors 128 of the temperature screening device 102 may comprise, for example, an array of temperature sensing devices configured to sense, detect, measure, and/or otherwise determine a temperature of various locations on a skin surface of the subject 132. Such locations on the skin surface may be referred to above and herein as "measurement sites" on the skin surface and/or of the subject 132. In any of the examples described herein, the one or more temperature sensors 128 may comprise a thermopile, a thermocouple, and/or a thermistor, configured to determine a temperature of one or more such measurement sites. Alternatively, each of the temperature sensors 128 may be configured to determine a temperature of other respective measurement sites of the subject 132 and/or to determine a temperature of one or more heat sources associated with the temperature screening system 100. It is understood that in some examples, determining a temperature of the subject 132 with the temperature screening device 102 may include contacting one or more measurement sites with the temperature screening device 102 and/or with at least a portion of one or more temperature sensors 128. Alternatively, in other example embodiments, a temperature of a measurement site of the subject 132 and/or a core temperature of the subject 132, may be determined without contacting the measurement site and/or other portions of the subject 132 with the temperature screening device 102 or with the one or more temperature sensors 128 associated therewith. For the duration of the disclosure, such noncontact temperature determination methods will be described in greater detail unless otherwise specified.

In example embodiments, one or more temperature sensors 128 may comprise an infrared temperature sensor such as, for example, a thermopile and/or other like infrared-based temperature sensing devices. In still further embodiments, one or more temperature sensors 128 may comprise an array of pixels and/or other like sensing elements configured to determine a temperature of the various measurement sites and/or heat sources described herein. The one or more temperature sensors 128 may be configured to convert thermal energy into electrical energy, and an example temperature sensor 128 may comprise two or more thermocouples connected in series or in parallel. Such components may be configured to generate an output voltage proportional to a local temperature difference and/or temperature gradient. In an example embodiment in which one or more temperature sensors 128 comprises at least one thermopile, the temperature screening device 102 may comprise, for example, an infrared thermometer. In such embodiments, the one or more temperature sensors 128 may be configured to receive and/or emit radiation, such as thermal and/or infrared radiation. For example, the one or more temperature sensors 128 may be configured to sense, detect, collect, and/or otherwise receive radiation emitted by the measurement site and/or by a heat source, such as, by respective locations on the face of the subject 132. In such embodiments, the one or more temperature sensors 128 may be configured to collect the radiation, and to send a signal to the controller 122 indicative of the collected radiation. For example, a first sensor of the one or more temperature sensors 128 may be configured to collect radiation from a first location on the face of the subject 132, and a second sensor of the one or more temperature sensors 128 may be configured to collect radiation from a second location on the face of the subject 132. In this way, the first sensor may be configured to determine a temperature of the first location while the second sensor may be configured to determine a temperature of the second location. In any of the examples described herein, one or more sensors of the temperature sensors 128 may also be configured to determine a temperature of a heat source that comprises a component of the temperature screening device 102, or that comprises a heat source that is spaced from and/or otherwise separate from the temperature screening device 102. The controller 122 may utilize the information received from the one or more temperature sensors 128 for any number of functions. For example, the controller 122 may be configured to determine a core temperature of the subject 132 based on such information and/or on one or more additional inputs.

In some examples, the one or more temperature sensors 128 may be embedded substantially within and/or formed integrally with the temperature screening device 102, and at least a portion of at least one of the one or more temperature sensors 128 may be disposed substantially coplanar with a front surface of the temperature screening device 102 and/or with the plane or location A described above. Additionally, each sensor of the one or more temperature sensors 128 may have a respective field of view, and such respective fields of view may overlap so as to form the collective field of view 130 of the one or more temperature sensors 128. The field of view 130 may be characterized by a width or an angle. For example, although illustrated in FIG. 1 as being substantially two-dimensional, it is understood that the field of view 130 may be substantially conical, substantially cylindrical, and/or any other three-dimensional shape, and may extend from the one or more temperature sensors 128 to at least the measurement site of the subject 132. Such a field of view 130 may be characterized by any desirable angle commonly associated with the one or more temperature sensors 128 described herein. For example, the field of view 130 may be characterized by angles less than approximately 20 degrees, and in some embodiments, by angles between approximately 5 degrees and approximately 15 degrees. In such embodiments, the field of view 130 may define the range and/or area of sensitivity for the one or more temperature sensors 128. For example, objects disposed within the field of view 130 may be detected and/or sensed by the one or more temperature sensors 128, and the one or more temperature sensors 128 may not be capable of sensing objects disposed outside of the field of view 130. Additionally, in some examples the temperature screening device 102 may include one or more lids, doors, covers, or other components that are moveable relative to the one or more temperature sensors 128. In an example, the temperature screening device 102 includes a lid (not shown) that is slidably, hingedly, or otherwise movably connected to a portion of the temperature screening device 102. In such an example, the lid may be moved out of the way of (e.g., moved out of the field of view 130 of) the one or more temperature sensors 128 during a temperature determination operation performed by the one or more temperature sensors 128. For instance, the lid may be moved out of the field of view 130 of a temperature sensor 128 such that a heat source of the temperature screening system 100 is within the field of view 130 and can be sensed by the temperature sensor 128. As noted above, such an example heat source may comprise a component of the temperature screening device 102, or may comprise a component that is spaced from and/or otherwise separate from the temperature screening device 102. Once the temperature of the heat source is determined by the temperature sensor 128, the lid can be repositioned at least partly within the filed of view 130, thereby blocking the temperature sensor 128 from sensing the heat source.

Additionally, the field of view 130 may have any length, range, or extent commensurate with the one or more temperature sensors 128 described herein, and the length of the field of view 130 may extend to and/or otherwise be characterized by the distance D illustrated in at least FIG. 1. In such embodiments, objects located at a distance less than or substantially equal to the distance D (i.e., within the field of view 130) may be detected and/or sensed by the one or more temperature sensors 128, while objects located at a distance greater than the distance D (i.e., outside of the field of view 130) may not be detected and/or sensed by the one or more temperature sensors 128.

With continued reference to FIG. 1, the temperature screening device 102 may also include a heat source 136, one or more image capture devices 138, a distance sensor 140, and/or one or more additional components 142, such as a clinical grade (e.g., a Food and Drug Administration (FDA) approved) thermometer 143 or other temperature sensing device (e.g., a non-clinical grade thermometer). For instance, as noted above, the temperature screening device 102 may include a heat source 136 supported by the housing 104 (e.g., disposed on, connected to, and/or disposed at least partly within the housing 104) configured to reach any desired (e.g., selected) temperature upon activation thereof. Such an example heat source 136 may comprise a resistance heater and/or any other electric heater. For example, such a heat source 136 may be configured to reach a desired temperature by passing a moderated electrical current therethrough. In example embodiments, the heat source 136 may be configured to selectively reach temperatures between approximately 90 degrees Fahrenheit and approximately 105 degrees Fahrenheit, and the controller 122 may be configured to cause the heat source 136 to reach a selected and/or otherwise desired temperature (also referred to herein as a "reference temperature"). Although shown schematically in FIG. 1, it is understood that the heat source 136 may be disposed within the housing 104 of the temperature screening device 102. Alternatively, in other embodiments the heat source 136 may be disposed on a surface (e.g., on the front surface) of the temperature screening device 102, or may be disposed external to the housing 104 (e.g., spaced a desired distance from the housing 104 and/or from the one or more temperature sensors 128). In any of the examples described herein, the heat source 136 may be disposed at least partly within the field of view 130 of the one or more temperature sensors 128. For example, when a measurement site of the subject 132 is disposed within the field of view 130 of the one or more temperature sensors 128, the one or more temperature sensors 128 may be configured to simultaneously determine a temperature of the measurement site and a temperature of the heat source 136. In such examples, the determined temperature of the heat source 136 may be substantially equal to the selected reference temperature, and the same one or more temperature sensors 128 may determine the temperature of both the measurement site and the heat source 136. In examples in which the heat source 136 is disposed external to the housing 104, the heat source 136 may be disposed, for example, one foot, two feet, three feet, four feet, six feet, ten feet, and/or any other desired distance from the housing 104 and/or from the subject 132 while still being disposed at least partly within the field of view 130. In some examples, the heat source 136 may be disposed proximate the subject 132 (e.g., at or proximate the location B) and/or may be disposed at the same distance D from the temperature screening device 102. In alternate examples, when the subject 132 is disposed at the distance D from the temperature screening device 102, the heat source 136 may be disposed at a distance from the temperature screening device that is greater than or less than the distance D.

Additionally, in examples in which the reference temperature of the heat source 136 is selected by, for example, the user 118 as a maximum desired threshold temperature, such a temperature may be used to determine whether or not the subject 132 should be permitted to enter a facility associated with the location 110 or whether the subject 132 should be referred for additional health evaluation. For instance, as will be described below, in some examples the user 118 may select a reference temperature (e.g., a maximum threshold temperature) of the heat source 136 that the user 118 believes is indicative of a healthy subject. In such examples, the user 118 may only permit subjects having a determined temperature (e.g., a determined temperature of the measurement site and/or a determined core temperature) less than or equal to the reference temperature to enter the facility associated with the location 110. Accordingly, the user 118 and/or the controller 122 may compare the determined temperature of the subject 132 with the determined temperature of the heat source 136 to discern whether the subject 132 should be permitted to enter the facility. In examples in which the determined temperature of the subject 132 is greater than the determined temperature of the heat source 136 (e.g., the reference or maximum threshold temperature), the user 118 and/or the controller 122 may refer the subject 132 for additional health evaluation. As part of such additional health evaluation, the user 118 may use the clinical grade thermometer 143 associated with the temperature screening device 102 to determine a temperature of the subject 132 (e.g., a core temperature of the subject 132) with a high degree of accuracy. In such examples, if the temperature of the subject 132 as determined by the clinical grade thermometer 143 is greater than the selected temperature associated with the heat source (e.g., the selected reference or maximum threshold temperature), the subject 132 may be denied entry to the facility and may be flagged for further medical attention.

As will be described in greater detail with respect to FIG. 2, in some examples the one or more temperature sensors of the temperature screening device 102 may include a dedicated temperature sensor configured to determine the temperature of the heat source 136 with a high degree of accuracy. For example, the temperature screening device 102 may further include a relatively high-accuracy thermistor configured to sense, measure, detect, and/or otherwise determine the temperature of the heat source 136. In other examples, the temperature screening device 102 may include a thermopile or other similar temperature sensor specifically configured to determine the temperature of the heat source 136 during use of the temperature screening device 102. In such examples, the temperature of the heat source 136 determined by such dedicated temperature sensors may be utilized as separate reference information indicative of the temperature of the heat source 136. The temperature of the heat source 136 determined by such dedicated temperature sensors may be utilized to validate the temperature of the heat source 136 as determined by the one or more temperature sensors 128 described above. In any of the examples described herein, such dedicated temperature sensors may adhere to applicable metrological standards, and may be configured to determine the temperature of the heat source 136 within a relatively tight/small tolerance range. For instance, in some examples, a dedicated temperature sensor included in the temperature screening device 102 may be configured to determine the temperature of the heat source 136 to within approximately +/−0.1 degrees Fahrenheit, within approximately +/−0.05 degrees Fahrenheit, within approximately +/−0.01 degrees Fahrenheit, and/or within tolerance ranges that are larger or smaller than those noted herein.

In particular, the highly accurate temperature determination made by such dedicated temperature sensors may simplify the evaluation of the subject 132. For instance, in examples in which the temperature of the heat source 136 is known/determined with a high degree of accuracy due to the use of such a dedicated temperature sensor, the corresponding temperature determinations of the subject 132 and of the heat source 136 made by the one or more temperature sensors 128 can be evaluated by the controller 122 on a relative basis. That is, by evaluating the relative temperatures of the subject 132 and the heat source 136, as determined by the same one or more temperature sensors 128, and with knowledge of the temperature of the heat source 136 to a high degree of accuracy, the user 118 and/or the controller 122 may determine whether the subject 132 should be permitted entry to the facility without having to know the absolute or core temperature of the subject 132. For example, if the heat source 136 is set to a maximum threshold temperature (e.g., 99 degrees Fahrenheit), and the dedicated temperature sensor determines that the heat source 136 does in fact have a temperature equal to the maximum threshold temperature, the user 118, and/or the controller 122 may determine that the subject 132 should not be permitted entry to the facility if the one or more temperature sensors 128 of the temperature screening device determine that the subject 132 has a temperature greater than the determined temperature of the heat source 136. In examples in which the temperature sensors 128 comprise an infrared camera or other thermal imaging device, such a determination may be made relatively easily based on differences or similarities between representations of the subject 132 and the heat source 136 visible in the same thermal image. Such representations of the subject 132 and the heat source 136 may be color-coded based on temperature in the thermal image, or may be grayscaled, for ease of evaluation.

With continued reference to FIG. 1, the image capture device 138 of the temperature screening device 102 may include one or more digital cameras, infrared sensors, and/or other like devices configured to assist in generating an image of the subject 132. For example, the image capture device 138 may comprise a digital camera operably connected to the controller 122 and/or the display 126, and the image capture device 138 may be configured to capture an image of the measurement site (e.g., the inner canthal regions) and/or other portions of the subject 132. Alternatively or in addition, the image capture device 138 may be configured to collect thermal, infrared, and/or other radiation emitted by the subject 132, and to assist in forming a thermal image of the subject 132 using and/or based on the collected radiation. In such example embodiments, the image capture device 138 may be configured to send information and/or signals to the controller 122 and/or the display 126, and the display 126 may display an image of the subject 132 using and/or based on such signals. In any of the examples described herein, such thermal images may also be generated based at least in part on temperatures determined by the one or more temperature sensors 128.

In example embodiments, the controller 122 may include components such as an image processor and/or image processing software configured to receive information and/or signals from the image capture device 138 and/or from the one or more temperature sensors 128. The image processor may be configured to assist in forming a visual image and/or a thermal image of the subject 132 based on such inputs. For example, in embodiments in which the image capture device 138 comprises a digital camera, the image processor may receive information and/or signals from the image capture device 138, and may assist in forming a visual image (e.g., a digital photograph, a digital video, real-time video, etc.) of the subject 132 based on such inputs. As shown in at least FIG. 1, such a visual image may be illustrated on the display of the temperature screening device 102.

Figure 6:
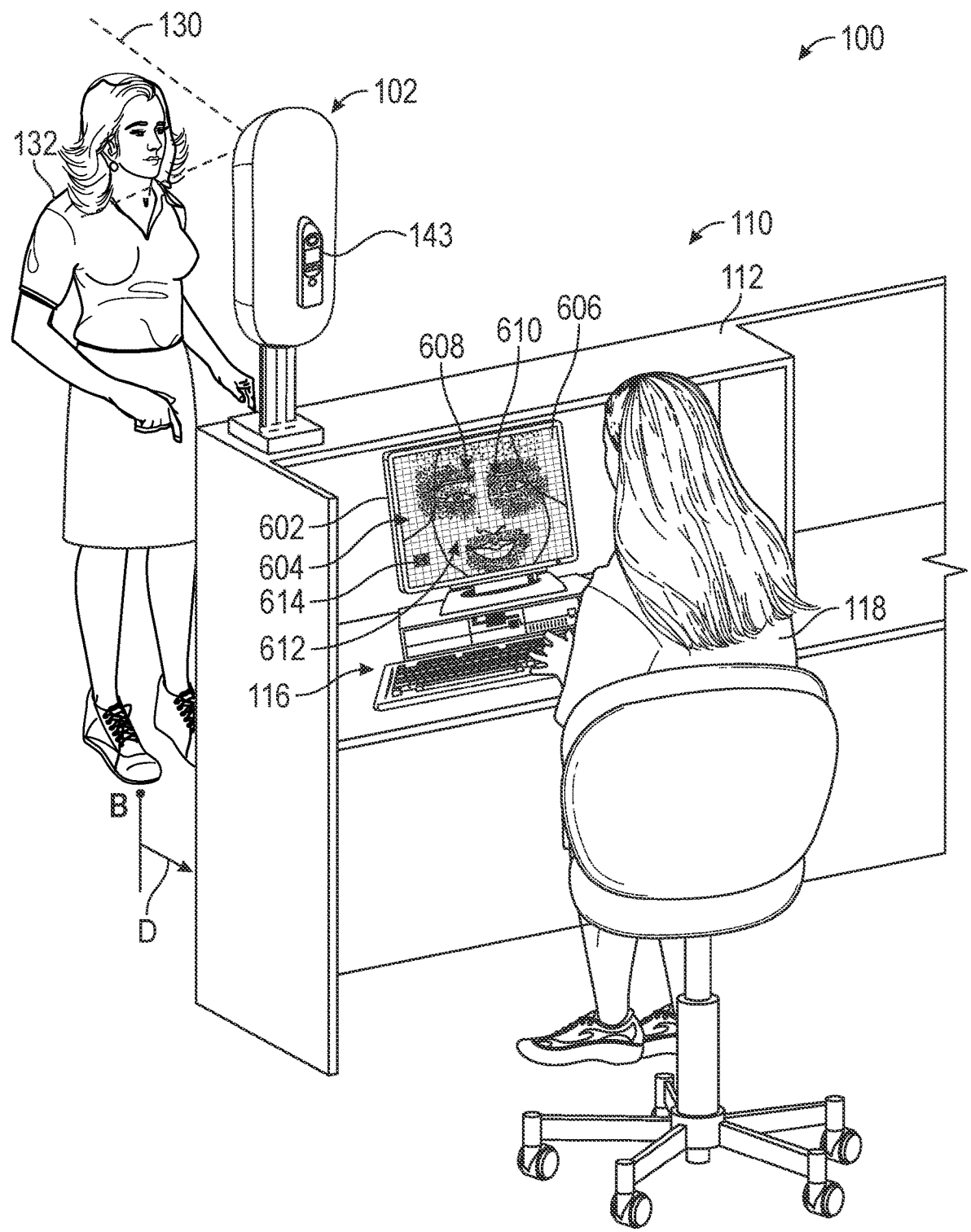
FIG. 6 illustrates an example thermal image captured using a temperature screening device of the present disclosure

Alternatively, in embodiments in which the image capture device 138 is configured to collect thermal, infrared, and/or other radiation emitted by the subject 132, the image processor may receive information and/or signals from the image capture device 138 and/or from the one or more temperature sensors 128 indicative of such collected radiation. In such embodiments, the image processor may assist in forming a thermal image (as shown in FIG. 6) of the subject 132 based on such inputs. Similar to the visual image described above, the thermal image may be illustrated on a display of the electronic device 116, and such a thermal image may comprise a two or three-dimensional image, temperature gradient, and/or temperature profile of the subject 132. The thermal image may also include an illustration, indication, representation, and/or other visual indicia of the heat source 136. Accordingly, the user 118 and/or the controller 122 may be able to evaluate the relative temperatures of both the heat source 136 and the measurement sites of the subject 132 as indicated by the same thermal image.

In some examples, multiple temperature determinations of the measurement sites may be made by the one or more temperature sensors 128 over a period of time to account for changes in the temperatures of such measurement sites. For example, in situations in which the subject 132 enters the location 110 after spending time in an environment having a temperature that is significantly different from the ambient temperature of the location 110 (e.g., entering the location 110 from a relatively cold outdoor environment or a from a relatively warm outdoor environment), the one or more temperature sensors 128 may be controlled to monitor a change in temperature of the one or more measurement sites of the subject 132 over a period of time (e.g., 5 seconds, 10 seconds, 30 seconds, one minute, etc.). In such examples, the controller 122 may be configured to determine a rate of change in such temperatures, respective magnitudes of the temperature changes, and/or other parameters, and may be configured to predict a core temperature of the subject 132 based at least in part on such a rate of change, one or more such magnitudes, and/or other such parameters. Further, in any of the examples described herein, the same one or more temperature sensors 128 of the temperature screening device 102 may be configured to determine both the temperature of the heat source 136 and the temperatures of the one or more measurement sites of the patient 132.

In some examples, the electronic device 116 described above may comprise a server, desktop computer, laptop computer, tablet computer and/or other such computing device. Such electronic devices 116 may include one or more LCD screens, touch screens, or other displays configured to display and/or output information and/or images to the user 118. For example, the electronic device 116 may include a display configured to display at least one of an image of the subject 132 and one or more temperatures determined by the temperature sensors 128 (e.g., a temperature of a measurement site on subject 132, a core temperature of the subject 132, a temperature of the heat source, etc.).

The distance sensor 140 of the temperature screening device 102 may comprise a proximity sensor and/or other like device configured to determine a distance between the distance sensor 140 and one or more objects disposed in the vicinity of the distance sensor 140 without contacting the object. For example, the distance sensor 140 may be operably connected to the controller 122, and may be supported by the housing 104. The distance sensor 140 may be configured to determine that the subject 132 is disposed at a desired distance D from the housing 104 and/or other portions or components of the temperature screening device 102. Such a distance sensor 140 may also be configured to determine the length, width, height, angular orientation, and/or other dimension or orientation of such objects relative to the distance sensor 140. Such dimensions may include, for example, a height of the subject 132, the height and/or width of a nose of the subject 132, the distance between the eyes of the subject 132, an inner-canthal distance, and/or any other like dimension. Such dimensions may also include, for example, a distance between various locations on a portion of the subject's face or on an additional measurement site. Such dimensions may be used to determine, for example, the age, gender, ethnicity, and/or other characteristics of the subject.

In example embodiments, the distance sensor 140 may be configured to determine whether and/or when the subject 132 is disposed a desired distance D from the temperature screening device 102 (e.g., from at least part of the housing 104). As noted above, the distance D may correspond to, for example, the field of view 130 of the one or more temperature sensors 128. Such an example distance may be equal to, for example, approximately 2 feet, approximately 3 feet, approximately 4 feet, and/or any other suitable distance greater than or less than those noted above. Such a distance sensor 140 may include, for example, an inductive sensor, a magnetic sensor, an infrared sensor, a capacitive photoelectric sensor, a sonic distance sensor, and/or any other like proximity sensor known in the art. In such embodiments, the distance sensor 140 may emit an electromagnetic field or beam of electromagnetic (such as infrared) radiation. Such a field or beam may impinge upon an object and at least a portion of the field of beam may return to the distance sensor 140. In such embodiments, the distance sensor 140 may determine a change in the field or return beam, and may determine the distance D between the distance sensor 140 and the object based on the determined change. In such embodiments, the distance sensor 140 may comprise a plurality of components including, for example, an emitter, a receiver, and/or other like sensing devices.

With continued reference to FIG. 1, the additional components 142 of the temperature screening device 102 may include, among other things, a microphone, a speaker, a haptic device, one or more light emitting diodes (LEDs) or other light sources, a web camera providing two-way communication, and/or other components configured to provide audible, visible, or tactile feedback to either the user 118 and/or to the subject 132. Such additional components 142 may also include one or more network interfaces or other components configured to enable data transfer and/or other communication between the temperature screening device 102 and other devices. For example, such components may enable communication between the temperature sensing device 102 and the electronic device 116, as noted above. Such components (e.g., the web camera noted above) may also enable communication, via a network 144 associated with the temperature screening system 100, between the temperature sensing device 102 and one or more remote servers 146 and/or other remote computing devices.

For instance, at least some of the network interfaces described herein may include a personal area network component to enable communications over one or more short-range wireless communication channels. Furthermore, at least some of the network interfaces may include a wide area network component to enable communication over a wide area network. Such network interfaces may enable, for example, communication between the temperature screening device 102 and the electronic device 116, the server 146, and/or other components of the temperature screening system 100, via the network 144. As used herein, the network 108 is typically any type of wireless network or other communication network known in the art. In some examples, the network 144 includes the Internet, an intranet, a wide area network (WAN), a local area network (LAN), a virtual private network (VPN), cellular network connections, and/or connections made using protocols such as 802.11a, b, g, n and/or ac.

As noted above, such additional components 142 may also include a clinical grade (e.g., an FDA approved) thermometer 143. Such a clinical grade thermometer 143 may comprise a contact or non-contact-based temperature measurement device configured to determine a core temperature of the subject 132 in accordance with ASTM E1104-98, ASTM E1965-98, ASTM E1112-000, ISO 80601-2-56, or other applicable performance standards. Such a clinical grade thermometer 143 may comprise, for example, the Welch Allyn® Braun ThermoScan® PRO 6000 thermometer, the Welch Allyn® SureTemp® Plus 690 thermometer, or other like devices. In some examples, the clinical grade thermometer 143 may be removably attached to the housing 104, the base 108, or other components of the temperature screening device 102. In other examples, components of the clinical grade thermometer 143 may be embedded within and/or formed integral with the temperature screening device 102. In any of the examples described herein, the clinical grade thermometer 143 and/or components thereof may comprise components of the temperature screening device 102 that are selectively deployable (e.g., removably attached, etc.) to determine the temperature of the subject 132, as needed, during a temperature screening operation.

For instance, the controller 122 of the temperature screening device 102 may be operably connected to one or more thermopiles, thermistors, or other temperature sensors of the clinical grade thermometer 143. In such examples, the controller 122 of the temperature screening device 102 may be configured to activate and/or control operations of the temperature sensors of the clinical grade thermometer 143. The temperature sensors of the clinical grade thermometer 143 may be configured to determine respective temperatures of the subject 132 with a high degree of accuracy, and such temperature sensors may provide information indicative of such determined temperatures to the controller 122 of the temperature screening device 102. The controller 122 may also be operably connected to one or more displays or other components of the clinical grade thermometer 143, and may be configured to activate and/or control operations thereof during use. Additionally or alternatively, a separate controller, control components (e.g., memory, processor, microprocessor, etc.), and/or control circuitry of the clinical grade thermometer 143 may be electrically and/or otherwise operably connected to the controller 122 of the temperature screening device 102. In some examples, such a controller, control components, and/or control circuitry of the clinical grade thermometer 143 may be operably connected to the controller 122 and/or various other components of the temperature screening device 102 via near-field communication, Bluetooth, WiFi, and/or other wireless communication protocols. For instance, the controller, control components, and/or control circuitry of the clinical grade thermometer 143 may be operably connected to the controller 122 and/or to the one or more servers 146 of the temperature screening system 100 via the network 144. In such examples, temperature information and/or other information determined by the clinical grade thermometer 143 may be stored in a memory of the one or more servers 146 (e.g., together with temperature information determined by the one or more temperature sensors 128 of the temperature screening device 102, an identifier uniquely identifying the subject 132, etc.), and can be used for further analysis, tracking, etc. It is understood that in further examples, the controller, control components, and/or control circuitry of the clinical grade thermometer 143 may be operably connected to the controller 122 via one or more electrical contacts, ports, or other mechanical, electrical, or electromechanical connections.

Figure 2:
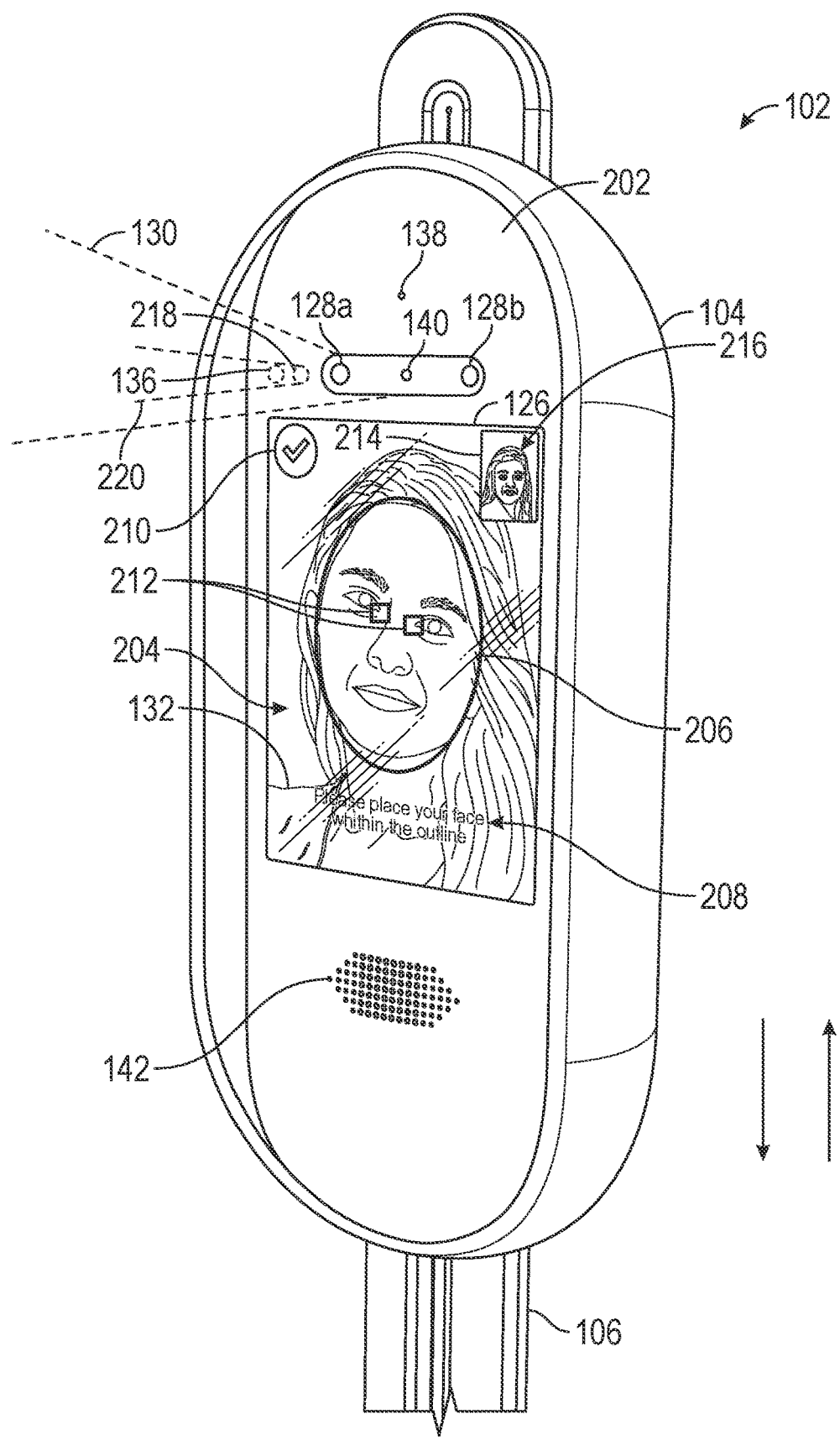
FIG. 2 illustrates an example temperature screening device associated with the system shown in FIG. 1.

FIG. 2 illustrates portions of an example temperature screening device 102 in more detail, and whenever possible, like numerals have been utilized to identify like components. For example, FIG. 2 illustrates the housing 104, the stem 106, the display 126, a first temperature sensor 128a, a second temperature sensor 128b (collectively "temperature sensors 128" as described above with respect to FIG. 1), the field of view 130 associated with the temperature sensors 128a, 128b, the heat source 136, the image capture device 138, the distance sensor 140, and one or more additional components 142 (e.g., a microphone, a speaker, etc.) described above with respect to FIG. 1. FIG. 2 also illustrates arrows indicating the directions in which the housing 104 of the temperature screening device 102 may be moved along the stem 106 in order to achieve a desired height or other position of the housing 104 relative to, for example the subject 132 and/or relative to the base 108 (FIG. 1).

As noted above, the one or more temperature sensors 128, the image capture device 138, the distance sensor 140, the heat source 136, and/or other components 120 of the temperature screening device 102 may be disposed substantially within the housing 104. In some examples, one or more of the temperature sensors 128, the image capture device 138, the distance sensor 140, and/or other such components may be disposed adjacent, proximate, and/or substantially coplanar with a surface of the housing 104, such as a front surface 202 of the housing 104. Such an example front surface 202 may comprise a substantially planar surface of the housing 104 and may provide the user 118 (FIG. 1) with access to various controls, displays, and/or other components of the temperature screening device 102. For example, the display 126 may be disposed substantially coplanar with the front surface 202, and in such examples, the display 126 may make up at least a portion of the front surface 202.

As can be seen in FIG. 2, the display 126 may be configured to provide a user interface 204 having one or more components useful in facilitating a temperature screening operation. For example, the user interface 204 may provide a variety of content configured to assist the subject 132 with positioning himself or herself at a desired distance D (e.g., at a desired location B) from the temperature screening device 102. The user interface 204 may also provide visual indicia and/or other content configured to indicate that the subject 132 is properly positioned relative to the temperature screening device 102. For example, in addition to providing a visual image (e.g., a digital photo, real-time digital video, etc.) of the subject 132, the user interface 204 may include one or more circles, ovals, rectangles, squares, triangles, and/or other visual indicia 206 serving as a desired spatial outline for the face of the subject 132. In such examples, such visual indicia 206 may serve as a visual indicator of a desired location of the subject 132, and/or of one or more of the measurement sites described herein.

In some examples, the user interface 204 may also include text 208 and/or other content configured to assist the subject 132 with positioning himself or herself at the desired distance D (e.g., at the desired location B) from the temperature screening device 102. For instance, such text 208 may include instructions guiding the subject 132 to move forward or backward relative to the temperature screening device 102 until their face is within the provided outline or other visual indicia 206 illustrated by the display 126. In some examples, the user interface 204 may also include additional visual indicia 212 comprising one or more circles, ovals, rectangles, squares, triangles, and/or other markers overlaying various locations of the subject's face in the image of the subject 132. In such examples, a first visual indicia 212 may be indicative of a corresponding first location or other measurement site of the subject 132 being disposed within the field of view 130, and a second visual indicia 212 may be indicative of a corresponding second location or other measurement sites of the subject 132 being disposed within the field of view 130. Similar to the visual indicia 206, the visual indicia 212 may be displayed in the user interface 204 together with the visual image of the subject 132. For example, as illustrated in FIG. 2, the visual indicia 212 may be displayed as overlaying the inner canthal regions or other measurement sites of the subject 132. Further, in some examples, one or more the visual indicia 206, 212 may not be displayed in the user interface 204 until the subject 132 is disposed at the desired distance D (e.g., at the desired location B).

In some examples, the user interface 204 may also include various additional content useful in performing various temperature screening operations. For instance, the user interface 204 may include one or more indicators 210 indicative of whether the subject 132 has passed or failed the temperature screening. For instance, in situations in which the user 118 and/or the controller 122 determines that the temperature of the subject 132 is less than or equal to the reference temperature (e.g., the maximum threshold temperature) described above, the user interface 204 may include an indicator 210 (e.g., a check mark, a thumbs-up, a green light, a smiley face, and/or other positive symbol) indicating that the subject 132 has passed the temperature screening. On the other hand, in situations in which the user 118 and/or the controller 122 determines that the temperature of the subject 132 is greater than the reference temperature described above, the user interface 204 may include indicator 210 (e.g., a yellow light, a red light, a thumbs down, a frown face, and/or other negative symbol) indicating that the subject 132 has failed the temperature screening and/or that the subject 132 should be referred for further screening or evaluation.

In some examples, the indicator 210 may include text, an arrow, an image, and/or a combination thereof indicating that the subject 132 failed a first phase of the temperature screening operation, and that the temperature of the subject 132 should be confirmed, during a second (e.g., subsequent) phase of the temperature screening operation, using the clinical grade thermometer 143 associated with the temperature screening device 102. In such examples, a first reference temperature (e.g., a first threshold temperature) may be selected by the user 118 for use in association with the one or more temperature sensors 128 during the first phase of the temperature screening operation. In some examples, a second reference temperature greater than or equal to the first reference temperature may also be selected by the user 118 for use in association with the clinical grade thermometer 143 during the second phase of the temperature screening operation. For example, a first reference temperature may be equal to approximately 99.9 degrees Fahrenheit, and a second reference temperature may be equal to approximately 100.5 degrees Fahrenheit. In other example temperature screening operations, the selected first reference temperature and/or the selected second reference temperature may be greater than or less than the temperatures noted above.

During an example first phase of a temperature screening operation, the user 118 may determine a temperature (e.g., a phase one temperature) of the subject 132 using the one or more temperature sensors 128 as described above. If the user 118 and/or the controller 122 determines, based on information received from the one or more temperature sensors 128, that the phase one temperature of the subject 132 is greater than the first reference temperature described above, the controller 122 may cause the user interface 204 to provide an indicator 210 indicating that the subject 132 has failed the first phase of the temperature screening operation, and/or that the temperature of the subject 132 should be verified, during a second phase of the temperature screening operation, using the clinical grade thermometer 143. During an example second phase of the temperature screening operation, the user 118 may determine an additional temperature (e.g., a phase two temperature) of the subject 132 using the clinical grade thermometer 143. If the user 118 and/or the controller 122 determines, based on information received from the clinical grade thermometer 143, that the phase two temperature of the subject 132 is greater than the second reference temperature described above, the controller 122 may cause the user interface 204 to provide text and/or an indicator 210 indicating that the subject 132 has failed the second phase of the temperature screening operation, and/or that the subject 132 should seek medical attention.

The user interface 204 may further include one or more windows 214 or other portions providing various additional content 216. For example, such additional content 216 may include, among other things, a digital image (e.g., a badge or photo I.D.) of the subject 132, a raw temperature or core temperature of the subject 132 as determined by the one or more temperature sensors 128, an ambient temperature at the location 110, the selected temperature of the heat source 136 (e.g., the selected threshold temperature), the determined temperature of the heat source 136, the name, address, gender, patient ID, badge number, department, and/or other information unique to the subject 132, and/or any other information associated with the subject 132.

Further, although not illustrated in FIG. 2, the temperature screening device 102 and/or the example user interfaces 204 described herein may comprise any combination of switches, buttons, levers, knobs, dials, keys, and/or other like components configured to activate, deactivate, manipulate, and/or otherwise control components of the temperature screening device 102. Such components of the user interface 204 and/or of the temperature screening device 102 may, for example, assist the user 118 in toggling through and/or selecting one or more modes of operation of the temperature screening device 102, enabling and/or disabling one or more components 120 of the temperature screening device 102, initiating a single substantially instantaneous temperature determination, initiating a substantially continuous and/or repeating temperature determination, and/or other like modes, functions, or operations. Accordingly, one or more components of the user interface 204 and/or of the temperature screening device 102 may be operably connected to at least one of the temperature sensors 128, the image capture device 138, the distance sensor 140, the heat source 136, and/or other components 120 of the temperature screening device 102.

Moreover, as noted above, the heat source 136 of the temperature screening device 102 may be disposed within the housing 104 of the temperature screening device 102. Alternatively, in other embodiments the heat source 136 may be disposed on a surface (e.g., on the front surface 202) of the temperature screening device 102 or may be disposed external to the housing 104. In any of the examples described herein, the heat source 136 may be disposed at least partly within the field of view 130 of the one or more temperature sensors 128. Additionally, as noted above, the temperature screening device 102 may include one or more dedicated temperature sensors configured to determine the temperature of the heat source 136 with a high degree of accuracy. Such an additional temperature sensor 218 is shown in FIG. 2. For example, the temperature sensor 218 may be separate from the temperature sensors 128, and may comprise a relatively high-accuracy thermistor configured to sense, measure, detect, and/or otherwise determine the temperature of the heat source 136. In other examples, the temperature sensor 218 may be separate from the temperature sensors 128, and may comprise a thermopile or other similar temperature sensor specifically configured to determine the temperature of the heat source 136 during use of the temperature screening device 102. In any of the examples described herein, the heat source 136 may be disposed within a field of view 220 of the temperature sensor 218 and within the field of view 130 of the one or more temperature sensors 128. In some examples, the field of view 220 may be at least partly within and/or may overlap with the field of view 130. Alternatively, in other examples, the field of view 220 may be outside of the field of view 130. In any of the examples described herein, the field of view 130 of the one or more temperature sensors 128 may be larger than the field of view 220 of the temperature sensor 218. As noted above, and in any of the examples described herein, the temperature sensor 218 may adhere to applicable metrological standards, and may be configured to determine the temperature of the heat source 136 within a relatively tight/small tolerance range. For instance, in some examples, the temperature sensor 218 may be configured to determine the temperature of the heat source 136 to within approximately +/−0.1 degrees Fahrenheit, within approximately +/−0.05 degrees Fahrenheit, within approximately +/−0.01 degrees Fahrenheit, and/or within tolerance ranges that are larger or smaller than those noted herein.

Figure 3:
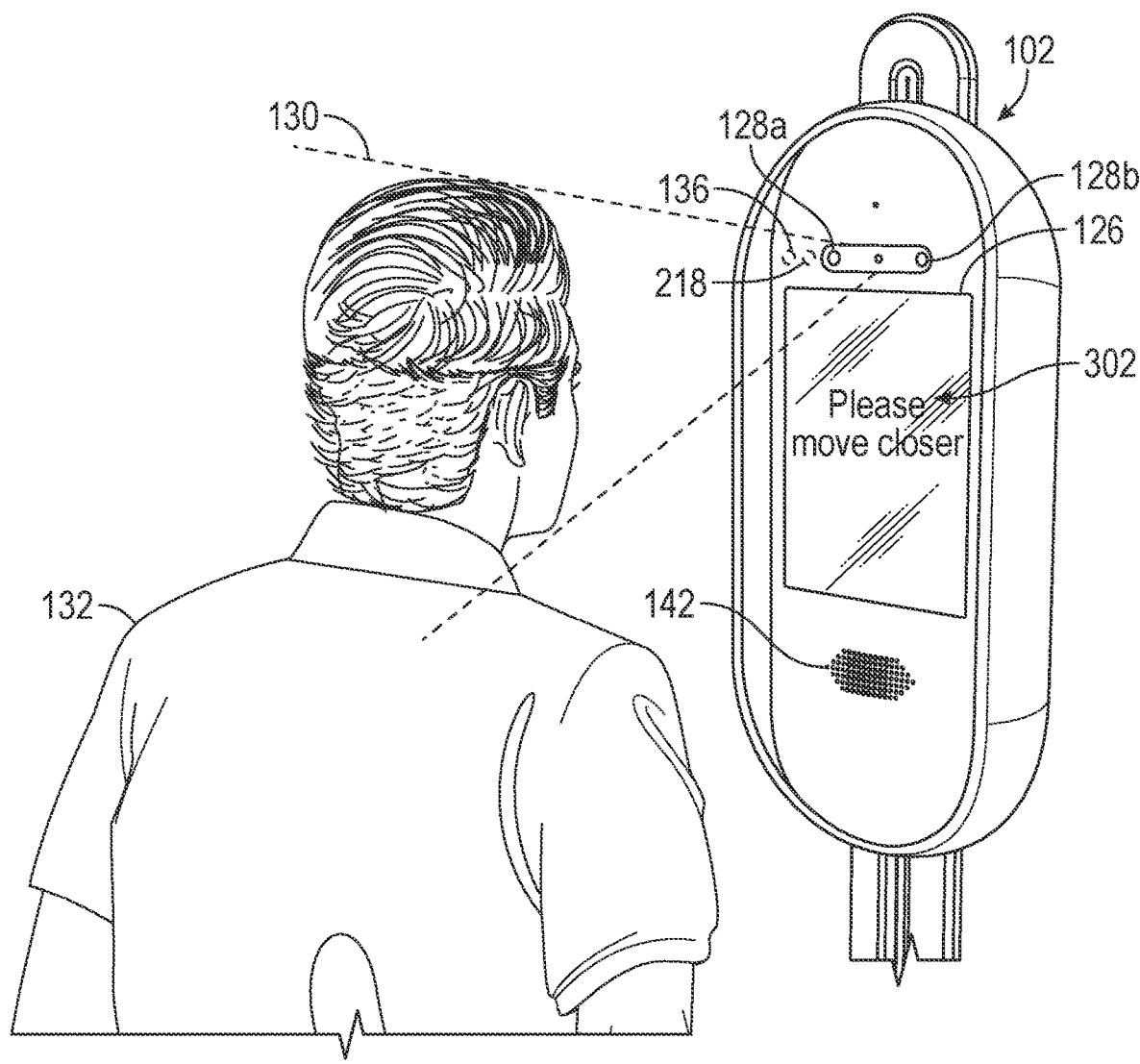
FIG. 3 illustrates another example temperature screening device of the present disclosure.
Figure 4:
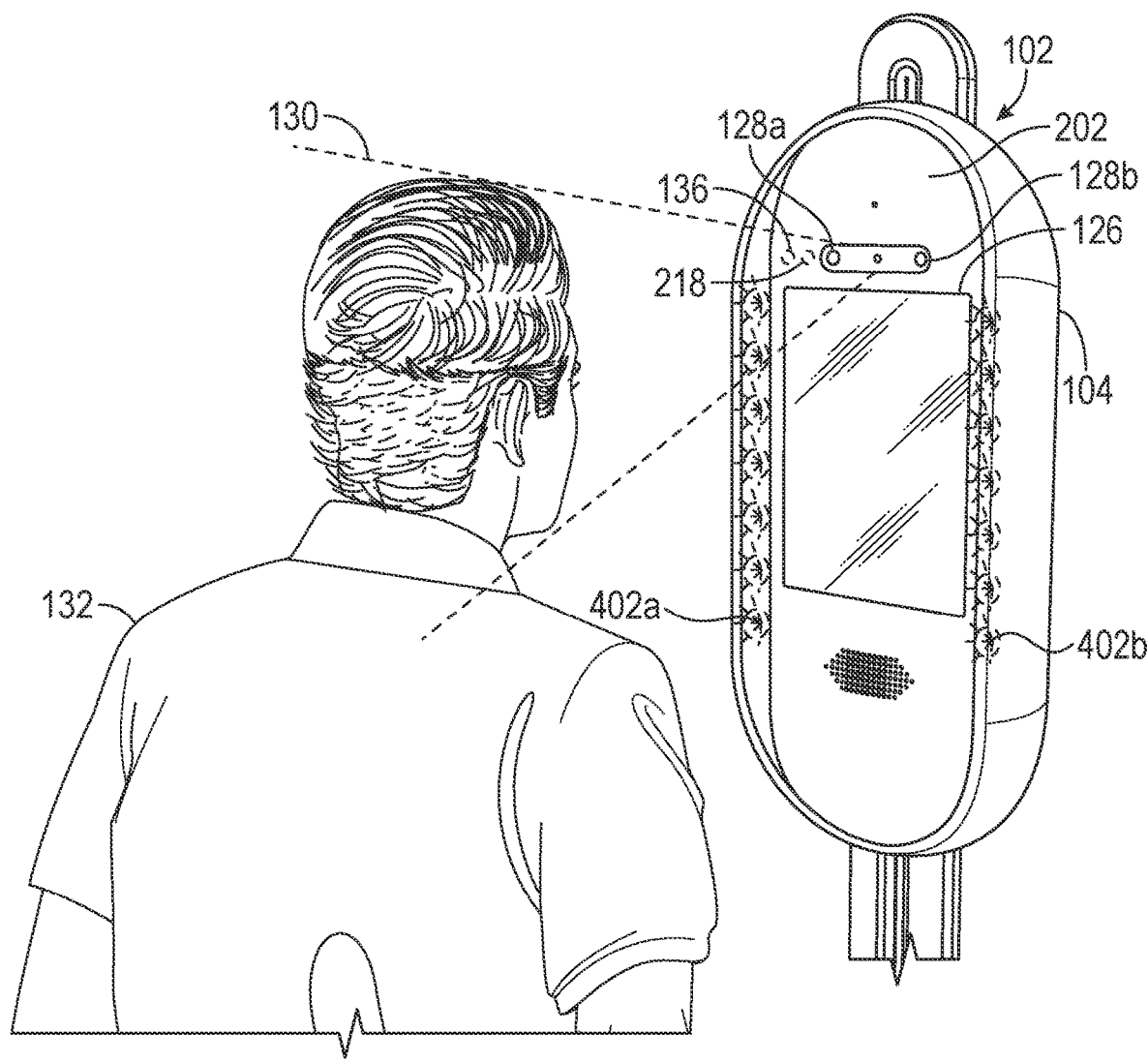
FIG. 4 illustrates still another example temperature screening device of the present disclosure.
Figure 5:
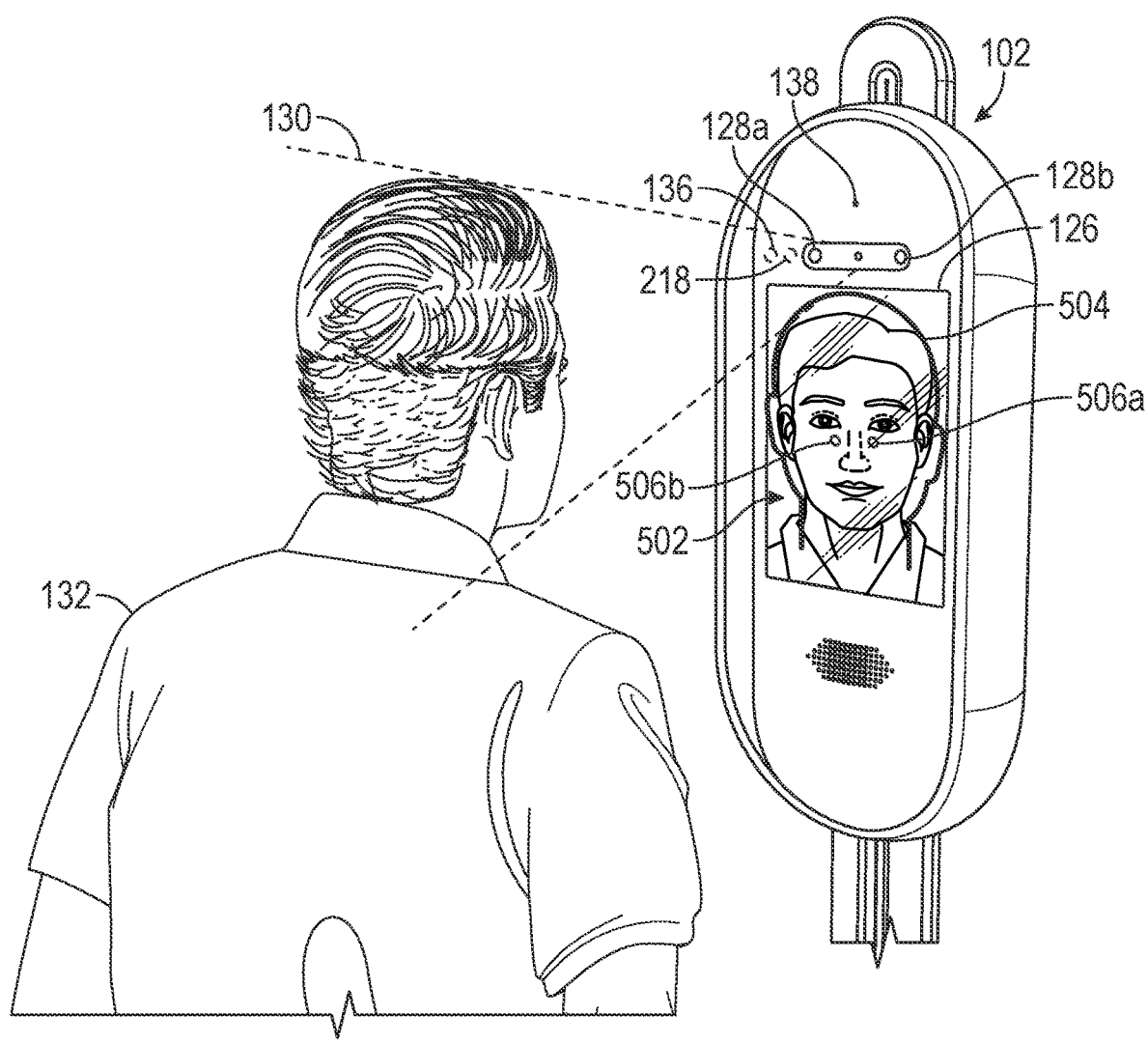
FIG. 5 illustrates yet another example temperature screening device of the present disclosure.

FIGS. 3-5 illustrate additional details and/or components associated with example temperature screening devices 102 of the present disclosure. As noted above with respect to FIG. 2, whenever possible, like numerals have been utilized in these figures to identify like components. For example, FIG. 3 illustrates the display 126, the first temperature sensor 128a, the second temperature sensor 128b, the field of view 130 associated with the temperature sensors 128a, 128b, the heat source 136, the dedicated temperature sensor 218, and one or more additional components 142 (e.g., a microphone, a speaker, etc.) described above. FIG. 3 also illustrates a user interface 302 providing further instructions to the subject 132. In this example, the user interface 302 displays text via the display 126 requesting that the subject 132 move closer to the temperature screening device 102. As described above with respect to FIG. 2, once the subject 132 is disposed at the proper distance D (e.g., at the location B), the user interface 302 may provide additional visual indicia indicating that the subject 132 is appropriately positioned. The example shown in FIG. 3 makes clear that the user interface 302 provided by the display 126 may be configured to display any desired instructions, information images, graphics, and/or other content to the user 118 and/or to the subject 132 in order to facilitate performing one or more temperature screening operations.

FIG. 4 illustrates the display 126, the first temperature sensor 128a, the second temperature sensor 128b, the field of view 130 associated with the temperature sensors 128a, 128b, the heat source 136, the dedicated temperature sensor 218, and the front surface 202 of the housing 104 described above. FIG. 4 also illustrates various light assemblies that could be included in an example embodiment of the temperature screening device 102. For instance, the example temperature screening device 102 shown in FIG. 4 includes a first light assembly 402a on a first side of the display 126 and a second light assembly 402b on a second side of the display 126. In example embodiments, the first and second light assemblies 402a, 402b may comprise one or more LEDs or other components configured to selectively illuminate at least a portion of the front surface 202. In such examples, the first and second light assemblies 402a, 402b may be disposed adjacent, proximate, and/or substantially coplanar with a surface of the housing 104, such as a front surface 202 of the housing 104. For example, the first and second light assemblies 402a, 402b may be disposed substantially coplanar with the front surface 202, and in such examples, the first and second light assemblies 402a, 402b may make up at least a portion of the front surface 202, along with the display 126.

In any of the examples described herein, the first and second light assemblies 402a, 402b may be configured provide a visible indication of whether the subject 132 has passed or failed the temperature screening. For instance, in situations in which the user 118 and/or the controller 122 determines that the temperature of the subject 132 is less than or equal to the threshold temperature described above, the controller 122 may cause the first and second light assemblies 402a, 402b to blink, illuminate, turn a first color (e.g., green), or otherwise provide a visual indication that the subject 132 has passed the temperature screening. On the other hand, in situations in which the user 118, and/or the controller 122 determines that the temperature of the subject 132 is greater than the threshold temperature described above, the controller 122 may cause the first and second light assemblies 402a, 402b to dim, remain unlit, turn a second color (e.g., yellow or red), or otherwise provide a visual indication that the subject 132 has failed the temperature screening and/or that the subject 132 should be referred for further screening or evaluation. Further, it is understood that in any of the examples described herein, the first and second light assemblies 402a, 402b may comprise peripheral lights that may assist in eliminating shadows during use of the temperature screening device 102. Such first and second light assemblies 402a, 402b may be activated on demand to improve lighting conditions at locations 110 and/or during times of day (e.g., early morning, late evening) in which ambient lighting conditions are poor.

FIG. 5 illustrates the display 126, the first temperature sensor 128a, the second temperature sensor 128b, the field of view 130 associated with the temperature sensors 128a, 128b, the heat source 136, the dedicated temperature sensor 218, and the image capture device 138 described above. FIG. 5 also illustrates a further example user interface 502 including content configured to assist the subject 132 with positioning himself or herself at a desired distance D (e.g., at a desired location B) from the temperature screening device 102. The user interface 502 may provide, for example, visual indicia 504 and/or other content configured to indicate that the subject 132 is properly positioned relative to the temperature screening device 102. For example, in addition to providing a visual image (e.g., a digital photo, real-time digital video, etc.) of the subject 132, the user interface 502 may include visual indicia 504 outlining the contour of a human head. Such visual indicia 504 may provide additional and/or more accurate contextual guidance to the subject 132 than, for example, the circles, ovals, or other shapes described above with respect to the visual indicia 206 shown in FIG. 2. In such examples, the visual indicia 504 may comprise a closely-fit spatial outline for the face of the subject 132. In such examples, such visual indicia 504 may serve as a visual indicator of a desired location of the subject 132, and/or of one or more of the measurement sites described herein.

In some examples, the user interface 502 may also include text and/or other content configured to assist the subject 132 with positioning himself or herself at the desired distance D (e.g., at the desired location B) from the temperature screening device 102. For instance, such text may include instructions guiding the subject 132 to move forward or backward relative to the temperature screening device 102 until their face is within the provided outline or other visual indicia 504 illustrated by the display 126. In some examples, the user interface 502 may also include additional visual indicia 506a, 506b comprising one or more circles, ovals, rectangles, squares, triangles, and/or other markers overlaying various locations of the subject's face in the image of the subject 132. Such additional visual indicia 506a, 506b may be indicative of a location or other measurement site of the subject 132 (e.g., right and left inner canthal regions) being disposed within the field of view 130.

In further examples, instead of providing a visual image (e.g., a digital photo, real-time digital video, etc.) of the subject 132 via the display 126 and/or via user interface 502, the display 126 may be replaced with a mirror or other like component. In such examples, the mirror may have the same shape, size, and/or other configurations as the display 126 illustrated in FIG. 5, and may also include one or more visual indicia similar to the visual indicia 504, 506a, 506b described above. For instance, such an example mirror may include visual indicia similar to the visual indicia 504 shown in FIG. 5 and comprising a closely-fit spatial outline for the face of the subject 132. In such examples, such visual indicia provided by the mirror may serve as a visual indicator of a desired location of the subject 132, and/or of one or more of the measurement sites described herein. Additionally, in some such embodiments the mirror may include one or more openings (e.g., holes), windows, lenses, filters, gratings, or other portions/components that are transparent to radiation. In such examples, one or more temperature sensors 128a, 128b of the present disclosure may be positioned proximate, behind, and/or adjacent to (e.g., substantially flush with) such portions of the mirror such that one or more of the measurement sites described herein are disposed at least partly within the respective fields of view 130 of the one or more temperature sensors 128a, 128b when the face of the subject 132 is within the provided outline or other visual indicia illustrated by the mirror, and/or when the subject 132 is positioned at the desired distance D (e.g., at the desired location B) from the temperature screening device 102. For example, the one or more temperature sensors 128a, 128b may be disposed at least partly within the housing 104, and/or may be positioned such that the field of view 130 extends, from the mirror, away from the housing 104. In some examples, the one or more openings, windows, lenses, filters, gratings, or other portions/components of the mirror noted above may be located proximate the locations of the visual indicia 506a, 506b shown in FIG. 5.

FIG. 6 further illustrates aspects and components of an example temperature screening system 100. As noted above with respect to FIGS. 2-5, whenever possible, like numerals have been utilized to identify like components. For example, FIG. 6 illustrates the temperature screening device 102, the field of view 130 associated with the temperature sensors 128, and the electronic device 116 being utilized by the user 118 described above. FIG. 6 also shows a display 602 of the electronic device 116 illustrating an example user interface 604. In the example shown in FIG. 6, the user interface 604 comprises a heat map or other thermal image generated (e.g., by the controller 122 and/or by a controller of the electronic device 116) using information captured by the one or more temperature sensors 128 of the temperature screening device 102 and/or by the image capture device 138. For example, as noted above, an image processor of the temperature screening device 102 may receive information and/or signals from the image capture device 138 and/or from the one or more temperature sensors 128 indicative of collected radiation. In such embodiments, the image processor may assist in forming a thermal image (as shown in the user interface 604 of FIG. 6) of the subject 132 based on such inputs. The thermal image of the user interface 604 may comprise a two or three-dimensional image, temperature gradient, and/or temperature profile of the subject 132. For instance, the thermal image may include a horizontal and vertical gridlines 606 and/or other indicia of the individual pixels associated with the image capture device 138 and/or with the one or more temperature sensors 128 of the temperature screening device 102. In some examples, each node of the gridlines 606 illustrated in the thermal image may correspond to a respective pixel or group of pixels of the image capture device 138.

As can be seen in FIG. 6, such a thermal image may be useful in identifying areas having different relative temperatures. For instance, as shown in the thermal image of FIG. 6 associated with the subject 132, various regions of the face of the subject 132 having substantially equal temperatures may share similar characteristics and the visual image. In particular, regions 608, 610 associated with the inner canthal regions of the subject's face may be substantially equal in temperature, and these regions 608, 610 may have a relatively higher temperature than other regions 612 of the subject's face. In such examples, the regions 608, 610 may have a substantially similar color, gradient, contour, texture, shading, and/or other appearance in the visual image of the user interface 604. Additionally, the color, gradient, contour, texture, shading, and/or other characteristics of the regions 608, 610 may differ from the color, gradient, contour, texture, and/or other corresponding characteristics of the region 612 due to the difference in temperature between such regions.

As can be seen in FIG. 6, the thermal image of the user interface 604 may also include (e.g. simultaneously) an illustration and/or indication 614 of the heat source 136. In any of the embodiments described herein, the heat source 136 may be disposed at least partly within the field of view 130 of the one or more temperature sensors 128 and/or within a corresponding field of view of the image capture device 138. As a result, the indication 614 shown in the thermal image of the user interface 604 may comprise a color, gradient, contour, texture, shading, and/or other characteristics similar to the relatively hot or regions 608, 610 of the subject's face. In such examples, the user interface 604 displayed and/or otherwise output by the display 602 may include a thermal image that simultaneously indicates, illustrates, and/or otherwise represents both the subject 132 and the heat source 136. Accordingly, the user 118 and/or the controller 122 may be able to relatively easily evaluate the relative temperatures of both the heat source 136 and the measurement sites of the subject 132 as indicated by the same thermal image.

For example, if the indication 614 associated with the heat source 136 is indicative of a maximum threshold temperature, and one or more of the regions 608, 610 shown in the thermal image have a color, gradient, contour, texture, shading, and/or other characteristics indicative of a temperature of the subject 132 that is greater than the maximum threshold temperature associated with the heat source 136, the user 118 and/or the controller 122 may be able to relatively easily determine that the subject 132 may require additional screening or treatment.

It is understood that the implementations of the temperature screening device 102 described herein are merely examples. The disclosed components and/or processes may be applicable to any other medical device that may use one or more sensors to calculate, estimate, look-up, measure, sense, monitor, and/or otherwise "determine" a temperature of a subject 132. Such a temperature may include a temperature of a measurement site of the subject 132, and such temperatures may comprise surface or skin temperatures of the subject 132 at the measurement site. Additionally, such a temperature may include any internal temperature of the subject 132, such as a sub-skull temperature, a rectal temperature, an oral temperature, an axillary temperature, a "core" temperature, and/or any other like temperature of the subject 132. Further, in any of the examples described herein, the electronic device 116 may be operably connected to the controller 122, and may be configured to display, either simultaneously (e.g., in the same user interface) or as components in one or more separate user interfaces, at least one of a temperature of the heat source 136 determined by one or more of the temperature sensors 128, a temperature (e.g., a core temperature, a temperature of one or more of the measurement sites, etc.) of the subject 132, and/or any of the images of the subject 132 described herein (e.g., a visual/digital image captured by the image capture device 138, one or more of the thermal images described above, etc.).

Figure 7:
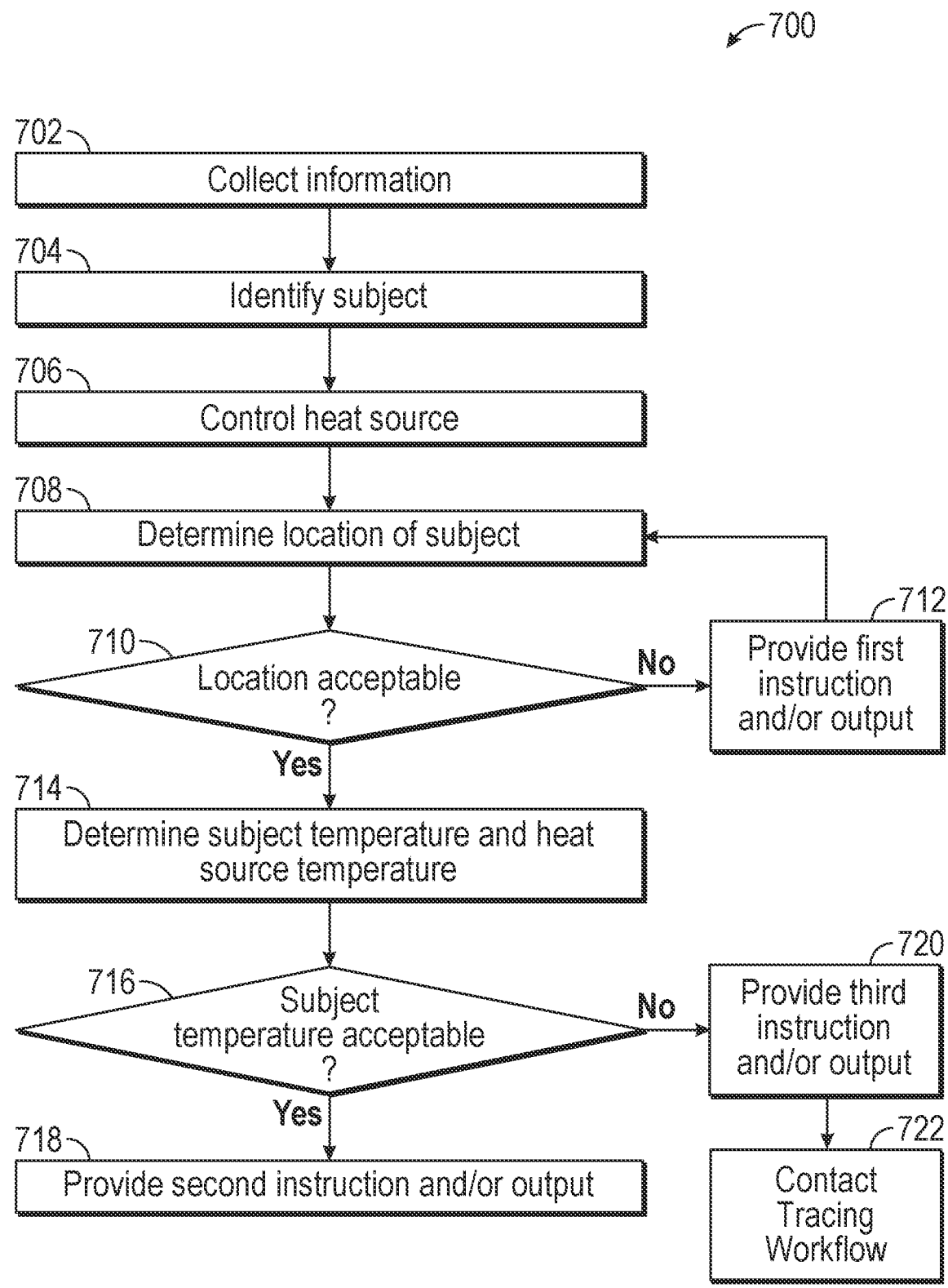
FIG. 7 illustrates a flowchart outlining an example method of the present disclosure.

FIG. 7 provides a flow diagram illustrating an example method 700 for temperature screening, as described herein. The method 700 is illustrated as collections of blocks in a logical flow graph, which represents a sequence of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the method 700. In some embodiments, one or more blocks of the method 700 can be omitted entirely.

The operations described below with respect to the method 700 can be performed by any of the example temperature screening systems 100 described herein, and/or by various components thereof. Unless otherwise specified, and for ease of description, the method 700 will be described below with reference to the system 100 shown in FIG. 1. In particular, although any of the operations described with respect to the method 700 may be performed by the controller of the electronic device 116, the method 700 will be described below with respect to the temperature screening device 102 and/or the controller 122 unless otherwise specified.

At 702, the controller 122 may collect first information associated with the subject 132. For example, at 702, the controller 122 may receive information, such as the name, date of birth, address, employee identification number, badge number, Social Security number, department, and/or other information uniquely identifying the subject 132. In such examples, the user 118 may enter such information via, for example, the electronic device 116. Additionally or alternatively, the subject 132 may enter such information directly using one or more of the user interfaces described herein and/or by scanning a badge, an identification card, a driver's license, and/or other item using the image capture device 138 of the temperature screening device 102.

At 704, the controller 122 may utilize the information received at 702 to perform one or more searches in the memory 124 in order to correlate the received information with other information stored in the memory 124. In particular, at 704, the controller 122 may identify a match between the information received at 702 and the information stored in the memory 124. Upon identifying such a match, the controller 122 may determine the identity, and/or may otherwise specifically identify the subject 132.

At 706, the controller 122 may control the heat source 136 to reach a desired temperature. For example, at 706 the controller 122 may cause a power source and/or a drive circuit of the temperature screening device 102 to direct electrical current to the heat source 136 at a desired voltage. In particular, at 706, the controller 122 may receive an input from the user 118 indicative of a selected and/or otherwise desired reference temperature. Alternatively, at 706, the controller 122 may operate and/or otherwise control the heat source 136 based on a preprogrammed or preselected reference temperature stored in the memory 124. In some examples, the reference temperature may be between approximately 90 degrees Fahrenheit and 105 degrees Fahrenheit, and at 706 the controller 122 may cause the heat source 136 to reach the reference temperature.

At 708, the controller 122 may determine a location of the subject 132 relative to the temperature screening device 102. For example, at 708 the controller 122 may cause the distance sensor 140 to determine the current location of the subject 132 relative to the temperature screening device 102. In some examples, the location of the subject 132 determined at 708 comprises a location of the subject 132 along the support surface 134. For instance, the location of the subject 132 determined at 708 may comprise a substantially linear, substantially horizontal distance extending from a first plane or location A associated with the temperature screening device 102, to a second plane or location B associated with the subject 132.

At 710, the controller 122 may determine whether the current location of the subject 132 is acceptable for performing a temperature screening operation. For example, at 710, the controller 122 may determine whether the subject 132 is currently located at a desired distance D from the temperature screening device 102 such that the face or other measurement site of the subject 132 is within the filed of view 130 of the one or more temperature sensors 128.

If, at 710, the controller 122 determines that the subject 132 is not currently located at the desired distance D from the temperature screening device 102 (710—No), at 712 the controller 122 may provide one or more first instructions and/or outputs via the display 126. For example, at 712 the controller 122 may cause the display 126 to provide various text 208 and/or other visual indicia requesting that the subject 132 either move toward or away from the temperature screening device 102. The controller 122 may then proceed to 708.

Alternatively, if at 710, the controller 122 determines that the subject 132 is currently located at the desired distance D from the temperature screening device 102 (710—Yes), at 714 the controller 122 may determine the temperature of the subject 132 and the temperature of the heat source 136. For example, at 714, the controller 122 may cause the one or more temperature sensors 128 to measure, sense, detect, and/or otherwise determine various temperatures associated with locations on the face of the subject 132 and/or otherwise associated with one or more desired measurement sites of the subject 132. In some examples, such measurement sites may comprise the inner canthal regions of the subject face. At 714, the controller 122 may also cause the one or more temperature sensors 128 to measure, sense, detect, and/or otherwise determine the temperature of the heat source 136 substantially simultaneously with determining the temperature of the measurement sites described above.

In some examples, at 714 the controller 122 may also cause the dedicated temperature sensor 218 to determine the temperature of the heat source 136. In such examples, the controller 122 may cause the temperature sensor 218 to measure, sense, detect, and/or otherwise determine the temperature of the heat source 136 substantially simultaneously with the one or more temperature sensors 128 determining the temperature of the measurement sites.

At 716, the controller 122 may determine whether the temperature of the subject 132 determined at 714 is acceptable based on various predetermined rules. For example, at 716 the controller 122 may determine whether the temperature of the subject 132 determined at 714, is less than or equal to the temperature of the heat source 136 determined at 714. In such examples, the selected and/or determined temperature of the heat source 136 may comprise a maximum temperature threshold associated with the location 110 in which the temperature screening system 100 is being employed. In such examples, if, at 716, the controller 122 determines that the determined temperature of the subject 132 is less than or equal to the determined temperature of the heat source 136 (716—Yes), at 718, the controller 122 may provide one or more second instructions and/or outputs via the display 126 and/or via the display 602. For example, at 718 the controller 122 may cause the display 126 and/or the display 602 to provide various text and/or other visual indicia indicating that the subject 132 passed the temperature screening and may proceed to the subject's desired destination.

Alternatively, if at 716, the controller 122 determines that the determined temperature of the subject 132 is greater than the determined temperature of the heat source 136 (716—No), at 720, the controller 122 may provide one or more third instructions and/or outputs via the display 126 and/or via the display 602. For example, at 720 the controller 122 may cause the display 126 and/or the display 602 to provide various text and/or other visual indicia indicating that the subject 132 failed the temperature screening and that further screening and/or medical attention may be required. Further, at 722, the controller 122 may cause the display 126 and/or the display 602 to provide text, graphics, and/or instructions associated with a contact tracing workflow. For example, at 722 the controller 122 may cause the display 126 and/or the display 602 to output questions requesting further information regarding whether the subject 132 recently traveled out of town, who the subject 132 has had recent close contact with, other local businesses or locations that the subject 132 has recently visited, etc. At 722, the controller 122 may receive inputs in response to such questions, may store the received information, and/or may send such information to other departments (e.g., Human Resources, a nursing station, etc.) associated with providing medical attention to the subject 132. At 722, the controller 122 may also identify one or more additional subjects that were recently screened at the location (e.g., patients entering the building within the last two minutes, five minutes, ten minutes, etc.), and the respective times at which such previous screenings took place. At 722, the controller 122 may send such additional information to the departments noted above as part of such a contact tracing workflow. At 722, the controller 122 may also be configured to determine respective levels of risk associated with each such additional subject based at least in part on the respective times at which the previous screenings took place, and the controller 122 may also provide such levels of risk to the departments noted above for evaluation.

It is understood that in any of the examples described herein, the use of an adjustable heat source 136 may enable different users 118 or different organizations to select a temperature screening strategy (e.g., to select a desired threshold/reference temperature) that is appropriate for their particular application. Existing temperature screening systems do not provide such functionality and, therefore, may not be appropriate for use in all applications. Further, because, in some examples, the heat source 136 of the present disclosure is disposed at least partly within the field of view 130 of the one or more temperature sensors 128 of the temperature screening device 102, the thermal image generated and/or other temperature information determined by the temperature sensors 128 and/or by the image capture device 138 includes information indicative of the temperature of the heat source 136. Accordingly, in applications in which the heat source 136 is set to a desired reference temperature (e.g., a maximum threshold temperature) the thermal image generated and/or other temperature information determined by the temperature sensors 128 and/or by the image capture device 138 reliably indicates whether the temperature of the subject 132 is above the reference temperature. Thus, even situations in which the temperature sensors 128 are note able to determine the core temperature or other temperatures of the subject 132 with a high degree of accuracy, the ultimate determination of whether the subject's temperature is above the reference temperature will still be reliable.

Other embodiments of the present disclosure will be apparent to those skilled in the art from consideration of the specification and practice of the embodiments described herein. Such additional embodiments are noted below.

In some examples, the temperature screening device 102 may include an external thermistor configured to determine ambient temperatures. Such ambient temperatures may be used as input into one or more temperature calculations (e.g., as an input into a subject temperature determination algorithm) in order to improve the accuracy of the temperature determination.

Additionally or alternatively, the temperature screening device 102 may be configured to obtain weather data and/or geographic data from one or more external sources (e.g., via the network 144). Such weather information (e.g., wind rating, snowfall forecast, precipitation totals, current wind chill, current heat index, current humidity level, etc.) may also be used as input into one or more temperature calculations (e.g., as an input into a subject temperature determination algorithm) in order to improve the accuracy of the temperature determination.

In some examples, the temperature screening device 102 may further include facial recognition functionality to apply encrypted identifiers to subjects 132, thereby allowing for trend data analysis.

In further examples, in addition to the functionality described above, the temperature screening device 102 may be configured to authenticate and/or otherwise verify that the subject 132 is authorized to be present at the location 110. For instance, the temperature screening device 102 may also be configured to scan an employee badge, a ticket for entry into a venue, etc. In any examples described herein, multiple temperature screening devices 102 may collect and/or monitor such information at respective locations 110 across a particular city, county, region, state, country, etc. In this way, the temperature screening devices 102 may be used to collect and track macro data and can be used to identify hotspots, outbreaks, or other trends. Each of the temperature screening devices 102 may be in communication and/or otherwise linked via the network 144 to facilitate the sharing and/or analysis of such macro information.

In additional examples, the temperature screening device 102 may be configured to issue a digital badge, QR code, or other identifier to a subject 132 once the subject 132 has passed an initial temperature screening on a given day. Such a digital badge, QR code, or other identifier may be sent from the temperature screening device 102 to, for example, a mobile device of the subject 132 such that the subject 132 can use the identifier to gain entry to a series of other locations 110 for the remainder of the day (or for any other pre-determined period of time) without being re-screened. Additionally or alternatively, as part of this process, an existing identification card or identification badge of the subject 132 could be flagged so that the subject 132 can gain entry to a series of other locations 110 for the remainder of the day (or for any other pre-determined period of time) without being re-screened. In any such examples, the period of time referred to above may be customizable or otherwise selected by the user 118 participating in the initial screening of the subject 132.

In a further example, the temperature screening device 102 may utilize one or more acclimation algorithms when determining one or more temperatures associated with the subject 132. For example, in order to minimize or eliminate wait times associated with allowing the subject 132 to acclimate to the ambient temperature at the location 110, the temperature screening device 102 may use one or more algorithms that determines a trend in the temperature change of the subject 132 over a relatively brief period of time and predicts the subject's temperature based at least in part on that trend. For instance, in some examples the temperature screening device 102 may only utilize temperatures obtained from locations on the subject's face that do not require time to acclimate (e.g., eyes, mouth, inner canthus, etc.). In other examples, the temperature screening device 102 may determine the temperature of one or more such areas and use a weighted average of these values when determining the temperature of the subject 132. Such an algorithm may also utilize weather data and/or other geographic temperature variables as inputs to the temperature calculation.

In still further examples, the temperature screening device 102 may be configured to identify one or more heat patterns associated with the face of the subject 132. For instance, temperature patterns on the face can be identified using thermal imaging, thermographs, or other heat maps described herein. Such temperature patterns may be used to determine whether or not the subject 132 is febrile.

In other examples, the temperature screening device 102 cold be configured to direct ultraviolet radiation or other light energy toward the face of the subject 132. Additionally or alternatively, the temperature screening device 102 may be configured to apply filtering (e.g., wavelength clipping or filtering) to one or more images of the subject 132 that are obtained during temperature screening. In such examples, the controller 122 may be configured to identify one or more patterns or profiles (e.g., outside of the visible band) indicative of fever, illness, or disease state.

In still other examples, the temperature screening device 102 may include one or more ultraviolet lights or other components that can be activated automatically (e.g., each night at 11:00 pm) or on demand to clean (e.g., disinfect) surfaces, portions, and/or components of the temperature screening device 102 (e.g., the front surface 202, the housing 104, etc.) that have been touched by the subject 132. In other examples, the temperature screening device 102 may include one or more finger clips or other components (and sensors) configured to determine a blood oxygen saturation of the subject 132. In such examples, the finger clips or other components may be sanitized using such ultraviolet lights. In some examples, UVC radiation may be used.

In further examples, the temperature screening device 102 may be configured to capture multiple temperature measurements in a relatively short period of time (e.g., multiple frames of data). In such examples, the temperature screening device 102 may capture 2-10 thermal images (e.g., thermographs), and may average the temperature values obtained in order to generate a single temperature. This technique may be used to increase the accuracy of the temperature measurements, and may account for movement of the subject 132 during measurements.

In still additional examples, the temperature screening device 102 may be configured to identify the inner canthus of the subject 132, and may be configured to provide feedback to the subject 132 regarding hair, glasses, scarves, hats, turtlenecks, and/or other items that may impede temperature measurements. For example, in response to identifying such items, the temperature screening device 102 may provide text, images, or other prompts requesting that the subject 132 remove such items.

In further examples, the temperature screening device 102 may be configured to begin measuring various temperatures of the subject 132 (e.g., temperatures of one or more measurement sites of the subject 132) as the subject 132 approaches the location B a desired distance D from the temperature screening device 102. In such examples, the temperature screening device 102 may utilize at least some of the temperature values obtained as the subject approaches the location B in order to determine the core temperature of the subject 132. For instance, the temperature screening device 102 may continue to assess and refine the temperature of the subject 132 until the subject 132 reaches the location B a desired distance from the temperature screening device 102. It is understood that if multiple subjects were walking toward the temperature screening device 102, the temperature screening device 102 could assess more than one subject 132 at a time if enough of their respective faces were available for assessment.

Further, as repeatedly noted above, the user 118 may be able to select the desired set point or reference temperature for the heat source 136. Such functionality may be advantageous at least because different organizations way wish to use different threshold temperatures. Additionally, it is understood that different illnesses are often characterized by different disease states (e.g., by different degrees of elevated temperature). As a result, the heat source 136 of the present disclosure may be selectively operated at a reference temperature that corresponds to the illness that the user 118 wishes to monitor.

In yet another example embodiment, the temperature screening device 102 may be configured to store, aggregate and perform trend analyses on the temperature data collected on the individual device. Such collected information may be used at the employer level or at the city/state/national level to identify community spread of an illness. In some examples, this information may be provided to the Center for Disease Control or other governmental agencies to assist in reducing the spread of disease and/or to assist in managing pandemics, etc. Such collected information may also be used to identify compliance with protocols put in place for safety. For example, if the information indicates a spike in temperatures associated with a single installation (e.g., at a single organization or franchise), such information may be indicative that there is a compliance issue at this particular installation.

In further example embodiments, the temperature screening device 102 may employ alternative technologies and/or alternate modalities (e.g., mm wave or video) for evaluating different parameters (e.g., respiration rate).

In an additional embodiment, the temperature screening device 102 may utilize two or more thresholds to identify and filter out a false high temperature and/or a false low temperatures. Using such filters may assist in eliminating outliers and may improve accuracy.

In any of the examples described herein, the temperature screening device 102 may be stationary or portable. For instance, the housing 104 may be removable from the stem 106, and may be configured for hand-held use as part of a portable workflow.

In some examples, the temperature screening device 102 may not display the determined temperature of the subject 132 in order to avoid any confidentiality issues associated with displaying such temperature. Instead, the display 126 may output one or more generic "pass" or "fail" outputs/prompts indicative of the temperature determination.

In further examples, and as described above with respect to at least FIG. 6, the heat source 136 and the face of the subject 132 may be represented in a colored thermal image generated by the temperature screening device 102. The specific color of the heat source 136, as shown in the thermal image, may be representative of the determined temperature of the heat source 136 (e.g., representative of the selected reference/threshold temperature). Similarly, the colors of the measurement sites of the subject 132, as shown in the colored thermal image, may be representative of the determined temperatures of the measurement sites. Thus, in example embodiments, if the user 118 and/or the controller 122 determines that the color of the measurement site of the of the subject 132 represents a higher temperature than the heat source 136, the temperature screening device 102 may determine that the subject failed the temperature screening without having to know the absolute or core temperature of the subject 132. A similar analysis could be done using greyscale (instead of colors). In such examples, the same temperature sensors 128 are used to determine the temperatures of the measurement sites and the heat source 136.

In any of the examples described herein, the temperature screening device 102 may provide visual feedback (e.g., video display or via lighted arrows on either side of the device) to guide the subject 132, or indicate that the subject 132 should proceed to a separate or side station where the subject 132 can be assessed with a more accurate thermometer to determine whether or not they actually have a fever. For example, as described above, the display 126 of the temperature screening device 102 and/or the display 602 of the electronic device 116 may provide an indicator 210 (e.g., text, an arrow, an image, and/or a combination thereof) indicating that the subject 132 failed a first phase of the temperature screening operation, and that the temperature of the subject 132 should be confirmed, during a second (e.g., subsequent) phase of the temperature screening operation, using the clinical grade thermometer 143 associated with the temperature screening device 102. In such examples, a first reference temperature (e.g., a first threshold temperature) may be selected by the user 118 for use in association with the one or more temperature sensors 128 during the first phase of the temperature screening operation. In some examples, a second reference temperature greater than or equal to the first reference temperature may also be selected by the user 118 for use in association with the clinical grade thermometer 143 during the second phase of the temperature screening operation. In this way, the temperature screening system 100 may provide a temperature screening device 102 for quickly screening the subject 132 for elevated temperature, and may also provide an FDA approved clinical grade thermometer 143 operably connected to and/or otherwise associated with the temperature screening device 102 for determining the temperature of the subject 132 with a high degree of accuracy.

In some examples, the temperature screening device 102 may provide text, video, and/or audio feedback to the subject 132 instructing/requesting that the subject 132 either speed up or slow down as they progress toward the temperature screening device 102 and/or toward the location B. Such feedback may improve the measurement process and may influence the overall throughput at the location 110. As noted above, in some examples, the temperature measurement device 102 may begin capturing temperature information as the subject 132 approaches the location B.

In still further examples, the temperature screening device 102 may be configured to sample ambient air at the location B, similar to a breathalyzer, to determine whether the subject 132 is under the influence of alcohol, drugs, or is concealing a potential weapon. For instance, the temperature screening device 102 may include a parts-per-million air filter.

In any of the examples described herein, the temperature screening device 102 may be powered by batteries, by mains, or by alternate renewable energy means (e.g., solar panels or other energy harvesting devices). In some examples, the renewable energy means could recharge automatically.

In still further examples, the temperature sensor device 102 may prompt the subject 132 with audible or text-based questions to supplement the temperature measurements described above. Such question may include, for example, "have you recently been around anyone with an illness?" "have you been feeling light-headed?" The answers to such questions provided by the subject 132 may assist in determining whether or not the subject 132 passes or fails the temperature screening.

It is intended that the specification and examples be considered as examples only, with a true scope and spirit of the present disclosure being indicated by the one or more claims submitted herewith.

What is claimed is:

1. A screening system, comprising:
   a controller;
   a housing;
   a first temperature sensor operably connected to the controller and physically connected to the housing, the first temperature sensor having a first field of view and a first accuracy within a temperature range;
   a second temperature sensor separate from the first temperature sensor, physically connected to the housing, and operably connected to the controller, the second temperature sensor having a second field of view, and having a second accuracy within the temperature range greater than the first accuracy; and
   a heat source, physically connected to the housing, controllable by the controller to achieve a reference temperature within the temperature range, and disposed at least partly within the first field of view of the first temperature sensor and at least partly within the second field of view of the second temperature sensor,
   the first temperature sensor being configured to simultaneously determine a temperature of a measurement site on a skin surface of a subject, and a first temperature of the heat source, without contacting the subject and the heat source,
   the second temperature sensor being configured to determine a second temperature of the heat source without contacting the heat source, and simultaneous with determination of the first temperature by the first temperature sensor, wherein when the first and second temperatures are simultaneously determined:
      the measurement site is outside of the second field of view of the second temperature sensor, and
      the second field of view overlaps with the first field of view at a location of the housing at which the heat source is disposed, the controller being configured to:
         determine that the second temperature determined by the second temperature sensor is substantially equal to a maximum threshold temperature, and
         based on determining that the second temperature is substantially equal to the maximum threshold temperature, determine whether the temperature of the measurement site determined by the first sensor is less than or equal to the second temperature determined by the second temperature sensor.

2. The screening system of claim 1, wherein the controller causes the second temperature sensor to determine the second temperature of the heat source simultaneously with the first temperature sensor determining the temperature of the measurement site,
   the controller being configured to provide visual indicia, via a display and based on determining that the first temperature is less than or equal to the second temperature, indicting passage of a temperature screening.

3. The screening system of claim 1, wherein:
   the second temperature sensor is embedded within the housing and disposed proximate the location of the housing at which the heat source is disposed,
   the temperature of the measurement site determined by the first sensor comprises a plurality of temperature determinations made by the first temperature sensor over a period of time, and
   the controller is further configured to determine a core temperature of the subject based on the plurality of temperature determinations.

4. The screening system of claim 1, further comprising a stem connected to the housing, and a base connected to the stem, wherein the housing is moveable relative to the stem to adjust a position of the housing relative to the base.

5. The screening system of claim 1, wherein the heat source comprises a resistance heater, and wherein the maximum threshold temperature is at least 99 degrees Fahrenheit.

6. The screening system of claim 3, wherein the first temperature sensor comprises an infrared sensor configured to collect radiation from the measurement site of the subject, and wherein the controller is configured to determine the core temperature of the subject based on respective magnitudes of the plurality of temperature determinations.

7. The screening system of claim 3, wherein the controller is configured to determine the core temperature of the subject based on a rate of change of the plurality of temperature determinations.

8. The screening system of claim 1, further including an image capture device operably connected to the controller and configured to capture a visual image of the subject, and a display operably connected to the controller and configured to display the visual image.

9. The screening system of claim 8, wherein the display is configured to display visual indicia, together with the visual image, indicating the subject is disposed at a desired distance from the housing.

10. The screening system of claim 9, further including a distance sensor operably connected to the controller and supported by the housing, the distance sensor being configured to determine that the subject is disposed at the desired distance from the housing.

11. The screening system of claim 8, further including an electronic device operably connected to the controller, and configured to control operation of at least one of the image capture device and the temperature sensor.

12. The screening system of claim 11, wherein the electronic device is configured to generate a user interface including a thermal image, the thermal image simultaneously representing the subject and the heat source.

13. A screening method, comprising:
   controlling a heat source of a temperature screening device to reach a maximum threshold temperature, the heat source being physically connected to a housing of the temperature screening device;
   determining a location of a subject;
   determining that the location is a desired distance from the temperature screening device;
   based at least in part on determining that the location is the desired distance from the temperature screening device, simultaneously determining, and without contacting the subject and the heat source:
      a temperature of a measurement site on a skin surface of the, subject and a first temperature of the heat source, using a first temperature sensor of the temperature screening device physically connected to the housing, and
      a second temperature of the heat source using a second temperature sensor of the temperature screening device physically connected to the housing and separate from the first temperature sensor, the second temperature sensor comprising a clinical grade thermometer;
   determining that the second temperature determined by the second temperature sensor is substantially equal to a maximum threshold temperature; and
   based on determining that the second temperature is substantially equal to the maximum threshold temperature, determining whether the temperature of the measurement site determined by the first temperature sensor is less than or equal to the second temperature determined by the second temperature sensor.

14. The screening method of claim 13, further comprising:
capturing an image of the subject with an image capture device of the temperature screening device; and
displaying the image, via a display of the temperature screening device, together with visual indicia indicating that the location is the desired distance from the temperature screening device.

15. The screening method of claim 13, further comprising:
determining that the temperature of the measurement site is less than or equal to the second temperature; and
based at least in part on determining that the temperature of the measurement site is less than or equal to the second temperature, causing a display of the temperature screening device to display visual indicia indicating that the subject passed a temperature screening.

* * * * *